United States Patent
Tsuruoka

(10) Patent No.: US 10,983,837 B2
(45) Date of Patent: Apr. 20, 2021

(54) METHOD AND APPARATUS FOR LOAD ESTIMATION

(71) Applicant: FUJITSU LIMITED, Kawasaki (JP)

(72) Inventor: Tetsumei Tsuruoka, Ichikawa (JP)

(73) Assignee: FUJITSU LIMITED, Kawasaki (JP)

( * ) Notice: Subject to any disclaimer, the term of this patent is extended or adjusted under 35 U.S.C. 154(b) by 343 days.

(21) Appl. No.: 15/633,808

(22) Filed: Jun. 27, 2017

(65) Prior Publication Data

US 2018/0011747 A1 Jan. 11, 2018

(30) Foreign Application Priority Data

Jul. 5, 2016 (JP) .............................. JP2016-133639

(51) Int. Cl.
| | |
|---|---|
| G06F 9/46 | (2006.01) |
| G06F 9/50 | (2006.01) |
| G06F 17/40 | (2006.01) |
| G06F 11/34 | (2006.01) |
| G06F 11/30 | (2006.01) |

(52) U.S. Cl.
CPC ........ G06F 9/5083 (2013.01); G06F 11/3006 (2013.01); G06F 11/3024 (2013.01); G06F 11/3414 (2013.01); G06F 11/3433 (2013.01); G06F 11/3442 (2013.01); G06F 11/3476 (2013.01); G06F 17/40 (2013.01); *G06F 2201/815* (2013.01)

(58) Field of Classification Search
None
See application file for complete search history.

(56) References Cited

U.S. PATENT DOCUMENTS

| | | | | | |
|---|---|---|---|---|---|
| 5,784,554 | A | * | 7/1998 | Hsiung | G06F 11/3409 714/45 |
| 5,974,536 | A | * | 10/1999 | Richardson | G06F 11/3409 711/100 |
| 6,112,317 | A | * | 8/2000 | Berc | G06F 11/3409 714/47.2 |
| 7,103,877 | B1 | * | 9/2006 | Arnold | G06F 11/3447 717/130 |

(Continued)

FOREIGN PATENT DOCUMENTS

| | | |
|---|---|---|
| EP | 2060977 A1 | 5/2009 |
| JP | 2008-310470 | 12/2008 |

(Continued)

OTHER PUBLICATIONS

Extended European Search Report dated Dec. 1, 2017 for European Patent Application No. 17178325.1, 11 pages.

(Continued)

*Primary Examiner* — Hiren P Patel
(74) *Attorney, Agent, or Firm* — Fujitsu Patent Center

(57) ABSTRACT

A disclosed load estimation method includes: collecting run information of a processor being executing a predetermined program; specifying execution status of the processor based on the collected run information; and estimating a load of the predetermined program based on a result of comparison between the execution status of the processor and execution characteristics of the processor. Each of the execution characteristics is stored in association with a load level of the predetermined program.

7 Claims, 32 Drawing Sheets

(56) References Cited

U.S. PATENT DOCUMENTS

| | | | | |
|---|---|---|---|---|
| 7,577,875 B2* | 8/2009 | Nelson | G06F 11/3688 | 702/57 |
| 7,720,643 B1* | 5/2010 | Becker | G06F 11/3442 | 702/182 |
| 8,024,458 B1* | 9/2011 | Buragohain | G06F 11/3495 | 709/224 |
| 8,032,869 B2* | 10/2011 | Hirai | G06F 11/3466 | 717/130 |
| 8,549,505 B2* | 10/2013 | Kimura | G06F 11/3466 | 717/158 |
| 8,635,381 B2* | 1/2014 | Arndt | G06F 11/3485 | 710/18 |
| 9,524,180 B2* | 12/2016 | Tashiro | G06F 9/45558 | |
| 9,858,170 B2* | 1/2018 | Maeda | G06F 11/3612 | |
| 10,733,009 B2* | 8/2020 | Yamamoto | G06F 9/45558 | |
| 2003/0151619 A1 | 8/2003 | McBride | | |
| 2004/0111708 A1 | 6/2004 | Calder et al. | | |
| 2005/0107997 A1* | 5/2005 | Watts | G06F 11/3419 | 703/21 |
| 2005/0160407 A1* | 7/2005 | Takamura | G06F 9/455 | 717/134 |
| 2006/0020918 A1* | 1/2006 | Mosberger | G06F 11/3466 | 717/124 |
| 2006/0259831 A1* | 11/2006 | Sohm | G06F 9/30145 | 714/45 |
| 2007/0226715 A1* | 9/2007 | Kimura | G06F 9/45516 | 717/148 |
| 2008/0177951 A1* | 7/2008 | Bartley | G06F 13/161 | 711/119 |
| 2008/0244198 A1* | 10/2008 | Goko | G06F 1/3203 | 711/154 |
| 2009/0083716 A1* | 3/2009 | Kimura | G06F 11/3612 | 717/129 |
| 2009/0319758 A1* | 12/2009 | Kimura | G06F 11/3466 | 712/220 |
| 2010/0077388 A1* | 3/2010 | Kimura | G06F 11/3466 | 717/158 |
| 2010/0204975 A1* | 8/2010 | Nakayama | G01R 31/318357 | 703/20 |
| 2010/0332785 A1* | 12/2010 | Huang | G06F 12/023 | 711/171 |
| 2012/0054375 A1* | 3/2012 | Arndt | G06F 11/3485 | 710/18 |
| 2012/0124560 A1* | 5/2012 | Indukuru | G06F 8/4442 | 717/127 |
| 2012/0246324 A1* | 9/2012 | Kan | G06F 11/3433 | 709/226 |
| 2013/0055034 A1* | 2/2013 | Qiu | G06F 11/3466 | 714/47.1 |
| 2014/0259011 A1 | 9/2014 | Tashiro et al. | | |
| 2015/0227446 A1 | 8/2015 | Horikawa | | |
| 2016/0239298 A1* | 8/2016 | Yamamoto | G06F 9/3001 | |
| 2018/0336057 A1* | 11/2018 | Yamamoto | G06F 9/45558 | |

FOREIGN PATENT DOCUMENTS

| | | |
|---|---|---|
| JP | 2014-170482 | 9/2014 |
| WO | 2014/050254 | 4/2014 |

OTHER PUBLICATIONS

EPOA—Office Action of European Patent Application No. 17178325.1 dated Feb. 16, 2021. ** All references cited in the EPOA were previously submitted in the IDS filed on Dec. 7, 2017, and considered by the Examiner on Jun. 11, 2019.

* cited by examiner

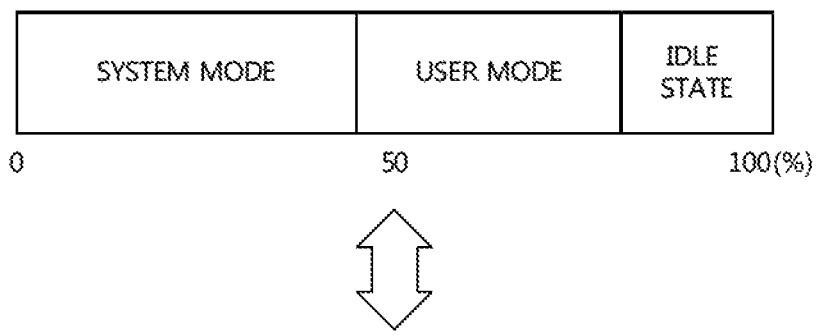
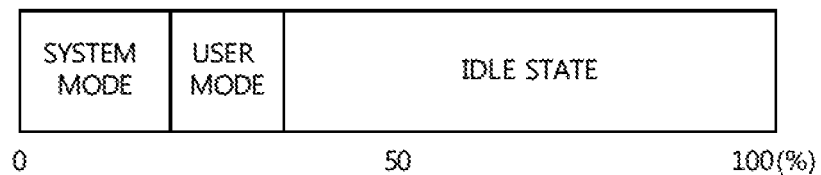
FIG.3

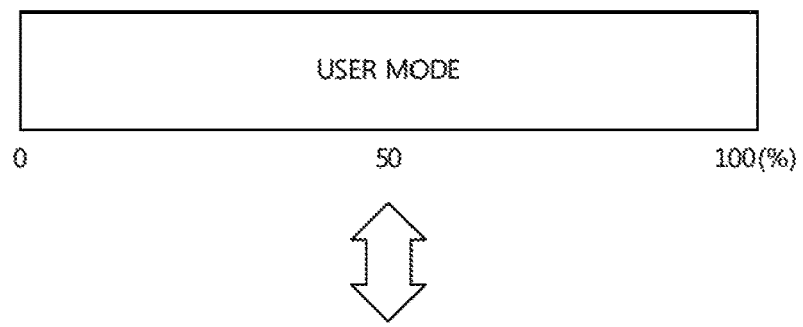
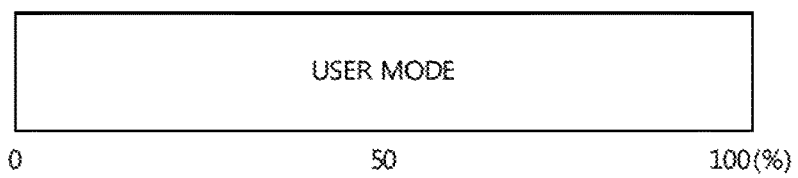
FIG.5
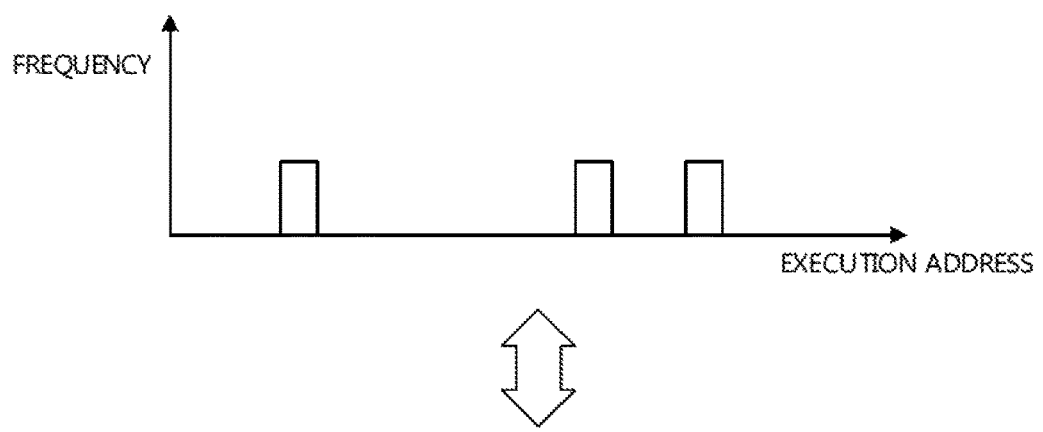
FIG.6

| SAMPLE NUMBER | EXECUTION ADDRESS VALUE |
|---|---|
| 1 | 0x004062cc |
| 2 | 0xa76f5fa4 |
| 3 | 0x00406373 |
| 4 | 0xdc836f9f |
| 5 | 0xa7722cb4 |
| 6 | 0xd91897db |
| 7 | 0xdab708c4 |
| 8 | 0x004082a0 |
| 9 | 0x004062f6 |
| 10 | 0xa7722d23 |
| 11 | 0xdab70845 |
| 12 | 0x00406373 |
| 13 | 0x004062cc |
| ⋮ | ⋮ |
| 999 | 0x00406373 |
| 1000 | 0x00406373 |

FIG.9

| BLOCK RANGE | NUMBER OF SAMPLES | OCCUPANCY RATE |
|---|---|---|
| 0x004062c0 - 0x004062ff | 120 | 12% |
| 0x00406340 - 0x0040637f | 160 | 16% |
| 0x00408280 - 0x004082bf | 10 | 1% |
| 0xa76f5f80 - 0xa76f5fbf | 10 | 1% |
| 0xa7722c80 - 0xa7722cbf | 80 | 8% |
| 0xa7722d00 - 0xa7722d3f | 40 | 4% |
| 0xd91897c0 - 0xd91897ff | 10 | 1% |
| 0xdab70840 - 0xdab7087f | 50 | 5% |
| 0xdab708c0 - 0xdab708ff | 40 | 4% |
| 0xdc836f80 - 0xdc836fbf | 10 | 1% |
| ⋮ | ⋮ | ⋮ |

| BLOCK WITH LARGEST NUMBER OF SAMPLES | | BLOCK WITH SECOND LARGEST NUMBER OF SAMPLES | | BLOCK WITH THIRD LARGEST NUMBER OF SAMPLES | | NUMBER OF BLOCKS IN EACH OF WHICH NUMBER OF SAMPLES EXCEEDS REFERENCE |
|---|---|---|---|---|---|---|
| BLOCK RANGE | OCCUPANCY RATE | BLOCK RANGE | OCCUPANCY RATE | BLOCK RANGE | OCCUPANCY RATE | |
| 0x00406340 - 0x004063ff | 16% | 0x004062c0 - 0x004062ff | 12% | 0xa7722c80 - 0xa7722cbf | 8% | 13 |

FIG.14

| LOAD LEVEL | CPU UTILIZATION OF APPLICATION | FIRST FEATURE BLOCK | | SECOND FEATURE BLOCK | | THIRD FEATURE BLOCK | | NUMBER OF BLOCKS IN EACH OF WHICH NUMBER OF SAMPLES EXCEEDS REFERENCE |
|---|---|---|---|---|---|---|---|---|
| | | BLOCK RANGE | OCCUPANCY RATE | BLOCK RANGE | OCCUPANCY RATE | BLOCK RANGE | OCCUPANCY RATE | |
| 1 | 0% | 0x00406340 - 0x0040637f | 70% | 0x004062c0 - 0x004062ff | 20% | 0xa7722c80 - 0xa7722cbf | 2% | 10 |
| 2 | 20% | 0x00406340 - 0x0040637f | 42% | 0x004062c0 - 0x004062ff | 17% | 0xa7722c80 - 0xa7722cbf | 4% | 30 |
| 3 | 40% | 0x00406340 - 0x0040637f | 34% | 0x004062c0 - 0x004062ff | 14% | 0xa7722c80 - 0xa7722cbf | 8% | 40 |
| 4 | 60% | 0x00406340 - 0x0040637f | 26% | 0x004062c0 - 0x004062ff | 12% | 0xa7722c80 - 0xa7722cbf | 11% | 40 |
| 5 | 80% | 0x00406340 - 0x0040637f | 18% | 0x004062c0 - 0x004062ff | 9% | 0xa7722c80 - 0xa7722cbf | 14% | 40 |
| 6 | 100% | 0x00406340 - 0x0040637f | 10% | 0x004062c0 - 0x004062ff | 7% | 0xa7722c80 - 0xa7722cbf | 17% | 40 |
| 7 | OVERLOAD | 0xdc836f80 - 0xdc836fbf | 20% | 0x004062c0 - 0x004062ff | 7% | 0xa7722c80 - 0xa7722cbf | 17% | 30 |

FIG.15

| TYPE | START ADDRESS | SIZE | NUMBER OF SAMPLES | OCCUPANCY RATE |
|---|---|---|---|---|
| SMALL TYPE | 0x004062cc | 42 | 140 | 14% |
| SMALL TYPE | 0x00406313 | 30 | 20 | 2% |
| ⋮ | ⋮ | ⋮ | ⋮ | ⋮ |
| LARGE TYPE | 0x004062cc | 120 | 170 | 17% |
| LARGE TYPE | 0xa7722cb0 | 116 | 10 | 1% |
| ⋮ | ⋮ | ⋮ | ⋮ | ⋮ |

FIRST FEATURE BLOCK

| LOAD LEVEL | CPU UTILIZATION OF APPLICATION | TYPE | START ADDRESS | SIZE | OCCUPANCY RATE |
|---|---|---|---|---|---|
| 1 | 0% | SMALL | 0x00406373 | 30 | 50% |
| 2 | 20% | SMALL | 0x00406373 | 30 | 42% |
| 3 | 40% | SMALL | 0x00406373 | 30 | 34% |
| 4 | 60% | SMALL | 0x00406373 | 30 | 26% |
| 5 | 80% | SMALL | 0x00406373 | 30 | 18% |
| 6 | 100% | SMALL | 0x00406373 | 30 | 10% |
| 7 | OVERLOAD | LARGE | 0xdab70844 | 128 | 20% |

SECOND FEATURE BLOCK

| TYPE | START ADDRESS | SIZE | OCCUPANCY RATE |
|---|---|---|---|
| SMALL | 0x004062cc | 42 | 20% |
| SMALL | 0x004062cc | 42 | 17% |
| SMALL | 0x004062cc | 42 | 14% |
| SMALL | 0x004062cc | 42 | 12% |
| SMALL | 0x004062cc | 42 | 9% |
| SMALL | 0x004062cc | 42 | 7% |
| SMALL | 0x004062cc | 42 | 7% |

THIRD FEATURE BLOCK

| TYPE | START ADDRESS | SIZE | OCCUPANCY RATE |
|---|---|---|---|
| NONE | NONE | NONE | NONE |
| LARGE | 0xa7722cb0 | 116 | 4% |
| LARGE | 0xa7722cb0 | 116 | 8% |
| LARGE | 0xa7722cb0 | 116 | 11% |
| LARGE | 0xa7722cb0 | 116 | 14% |
| LARGE | 0xa7722cb0 | 116 | 17% |
| LARGE | 0xa7722cb0 | 116 | 17% |

FIG.24

| FUNCTION NAME | FIRST ADDRESS | SIZE |
|---|---|---|
| func01 | 0x0042a260 | 0x00000016 |
| func02 | 0x0042a280 | 0x0000001e |
| func03 | 0x0042a2a0 | 0x00000005 |
| ⋮ | ⋮ | ⋮ |

| FUNCTION NAME | NUMBER OF SAMPLES | OCCUPANCY RATE |
|---|---|---|
| func01 | 350 | 35% |
| func02 | 160 | 16% |
| func81 | 130 | 13% |
| func82 | 20 | 2% |
| func91 | 30 | 3% |
| func92 | 60 | 6% |
| func93 | 40 | 4% |
| ⋮ | ⋮ | ⋮ |

FIG.27

| LOAD LEVEL | CPU UTILIZATION OF APPLICATION | OCCUPANCY RATE OF func01 | OCCUPANCY RATE OF func02 | OCCUPANCY RATE OF func81 |
|---|---|---|---|---|
| 1 | 0% | 60% | 0% | 0% |
| 2 | 20% | 50% | 7% | 5% |
| 3 | 40% | 40% | 14% | 10% |
| 4 | 60% | 30% | 21% | 15% |
| 5 | 80% | 22% | 27% | 19% |
| 6 | 100% | 14% | 33% | 23% |

FIG.29

|  | func01 | func02 | func81 |
|---|---|---|---|
| WEIGHT | 2 | 1 | 1 |

FIG.30

| GROUP NAME | FUNCTION NAME | FUNCTION NAME | FUNCTION NAME |
|---|---|---|---|
| group01 | func01 | func02 | - |
| group02 | func81 | func82 | - |
| group03 | func91 | func92 | func93 |
| ⋮ | ⋮ | ⋮ | ⋮ |

FIG.32

| GROUP NAME | NUMBER OF SAMPLES | OCCUPANCY RATE |
|---|---|---|
| group01 | 510 | 52% |
| group02 | 150 | 15% |
| group03 | 130 | 5% |
| ⋮ | ⋮ | ⋮ |

FIG.33

| LOAD LEVEL | CPU UTILIZATION OF APPLICATION | OCCUPANCY RATE OF group01 | OCCUPANCY RATE OF group02 |
|---|---|---|---|
| 1 | 0% | 61% | 0% |
| 2 | 20% | 58% | 6% |
| 3 | 40% | 55% | 11% |
| 4 | 60% | 52% | 15% |
| 5 | 80% | 50% | 20% |
| 6 | 100% | 48% | 24% |

|  | group01 | group02 |
|---|---|---|
| WEIGHT | 2 | 1 |

METHOD AND APPARATUS FOR LOAD ESTIMATION

CROSS-REFERENCE TO RELATED APPLICATIONS

This application is based upon and claims the benefit of priority of the prior Japanese Patent Application No. 2016-133639, filed on Jul. 5, 2016, the entire contents of which are incorporated herein by reference.

FIELD

This invention relates to a technique for measuring a load of a program being running.

BACKGROUND

For example, if it is possible to specify a load of an application running on a server apparatus, it is useful for determining whether or not resources allocated to the application are sufficient.

In general, it is possible to grasp a degree of the load by CPU (Central Processing Unit) utilization of the application, which is measured in an operating system. However, in order to grasp the load of the application with a type in which the CPU utilization in the operating system cannot be measured, means other than measurement by the operating system is required.

Patent Document 1: International Publication Pamphlet No. WO 2014/050254
Patent Document 2: Japanese Laid-open Patent Publication No. 2008-310470
Patent Document 3: Japanese Laid-open Patent Publication No. 2014-170482

In other words, there is no technique for easily grasping the load of a predetermined program.

SUMMARY

A load estimation method related to one aspect includes: collecting run information of a processor being executing a predetermined program; specifying execution status of the processor based on the collected run information; and estimating a load of the predetermined program based on a result of comparison between the execution status of the processor and execution characteristics of the processor. Each of the execution characteristics is stored in association with a load level of the predetermined program.

A load estimation method related to one aspect: collecting run information of a processor being executing a predetermined program; specifying execution status of a routine of the predetermined program based on the collected run information; and estimating a load of the predetermined program based on a result of comparison between the execution status of the routine and execution patterns of routines of the predetermined processor, wherein each of the execution patterns is stored in association with a load level of the predetermined program.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram depicting an example of CPU utilization;
FIG. 5 is a diagram depicting an example of CPU utilization;
FIG. 6 is a diagram depicting an example of a frequency distribution of execution addresses;
FIG. 9 is a diagram depicting an example of a log table;
FIG. 14 is a diagram depicting an example of execution status data;
FIG. 15 is a diagram depicting an example of an execution characteristic table;
FIG. 24 is a diagram depicting an example of an execution characteristic table in a third embodiment;
FIG. 27 is a diagram depicting an example of a second execution status table;
FIG. 29 is a diagram depicting an example of an execution pattern table;
FIG. 30 is a diagram depicting an example of weight data;
FIG. 32 is a diagram depicting an example of a group table;

FIG. 33 is a diagram depicting an example of the second execution status table in a fifth embodiment;

DESCRIPTION OF EMBODIMENTS

Embodiment 1

Figure 1:
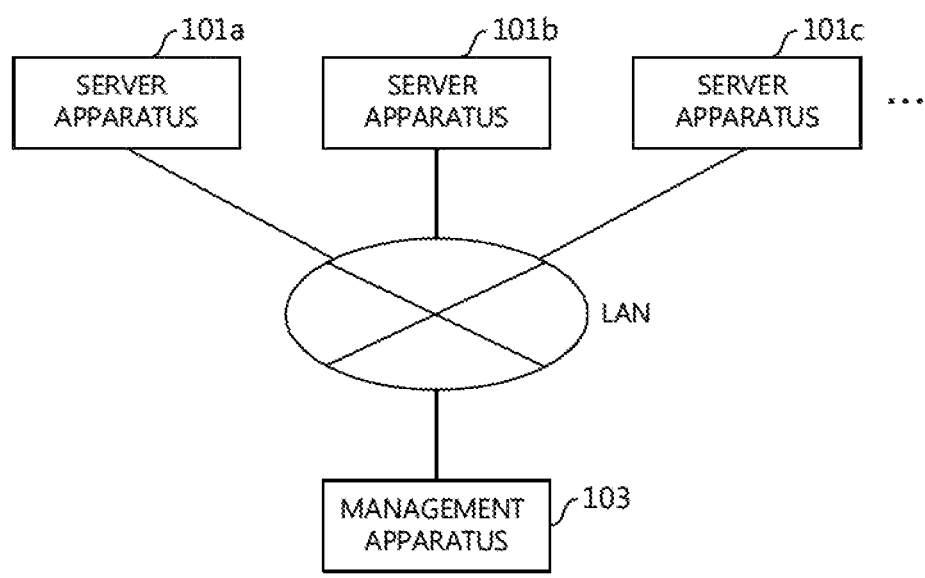
FIG. 1 is a diagram depicting an example of a system configuration.

For example, assume a system configuration illustrated in FIG. 1. Plural server apparatuses 101a to 101c and management apparatus 103 are connected to a LAN (local area network) of the system in this example. The plural server apparatuses 101a to 101c cooperate to provide a predetermined service. The management apparatus 103 monitors status of the server apparatuses 101a to 101c.

Figure 2:
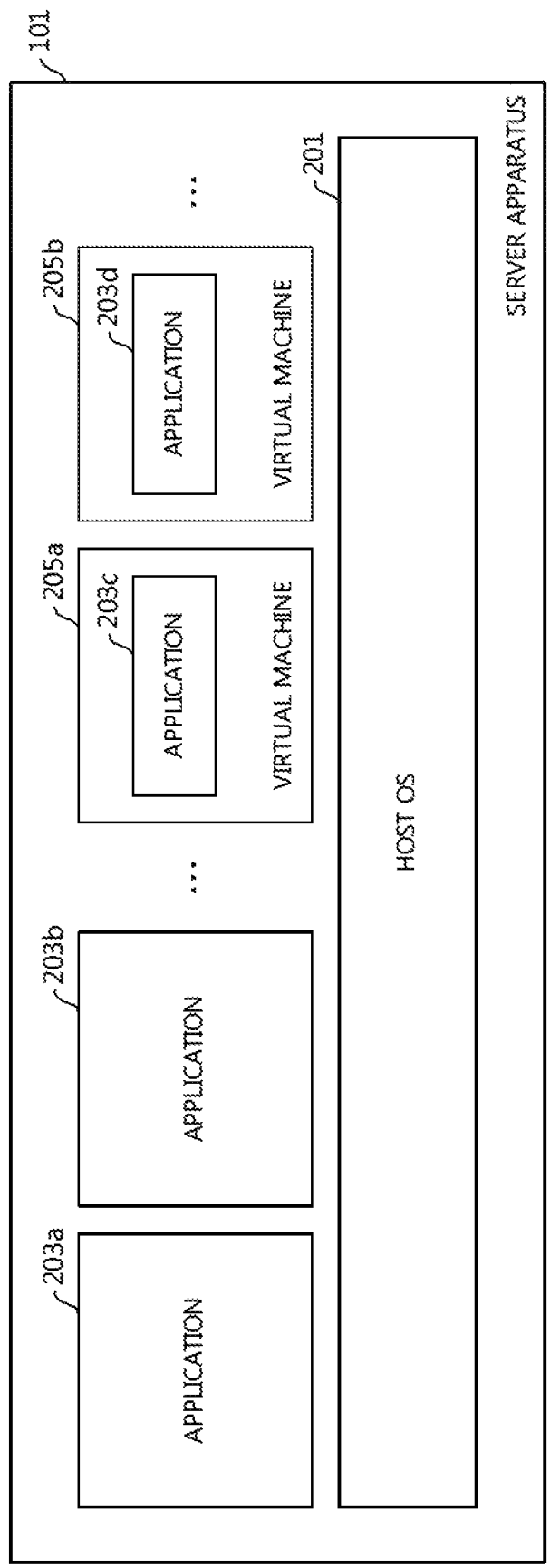
FIG. 2 is a diagram depicting an example of a module configuration of a server apparatus.

FIG. 2 illustrates an example of a module configuration of the server apparatus 101. In this example, in an environment of a host OS (operating system) 201, plural applications 203a and 203b are running. In addition, plural virtual machines 205a and 205b are provided, and an application 203c runs in the virtual machine 205a and an application 203d runs in the virtual machine 205b.

FIG. 3 illustrates an example of CPU utilization measured in the host OS 201. CPU utilization in a system mode and CPU utilization in a user mode are measured. Then, the residual of the CPU utilization in the system mode and the CPU utilization in the user mode correspond to a ratio of an idle state.

Measurement results when the load due to the application 203 is high are illustrated in the upper part. The CPU utilization in the system mode and the CPU utilization in the user mode are large, and the ratio of the idle state is small.

On the other hand, as illustrated in the lower part, when the load due to the application 203 is low, the CPU utilization in the system mode and the CPU utilization in the user mode are small, and the ratio of the idle state is large.

By monitoring CPU utilization measured in this manner, it becomes useful in adjustment of resource allocation, for example. It becomes useful as well when a hypervisor in place of the host OS 201 is running in the server apparatus 101.

The aforementioned normal application 203 exchanges data with a driver via a kernel of the host OS 201, for example. Therefore, it is possible for the host OS 201 to distinguish between a runtime in the system mode and a runtime in the user mode.

On the other hand, in the case of the application 203 that exchanges data with the driver without using the kernel of the host OS 201, it is not possible for the host OS 201 to distinguish between the runtime in the system mode and the runtime in the user mode.

Figure 4:
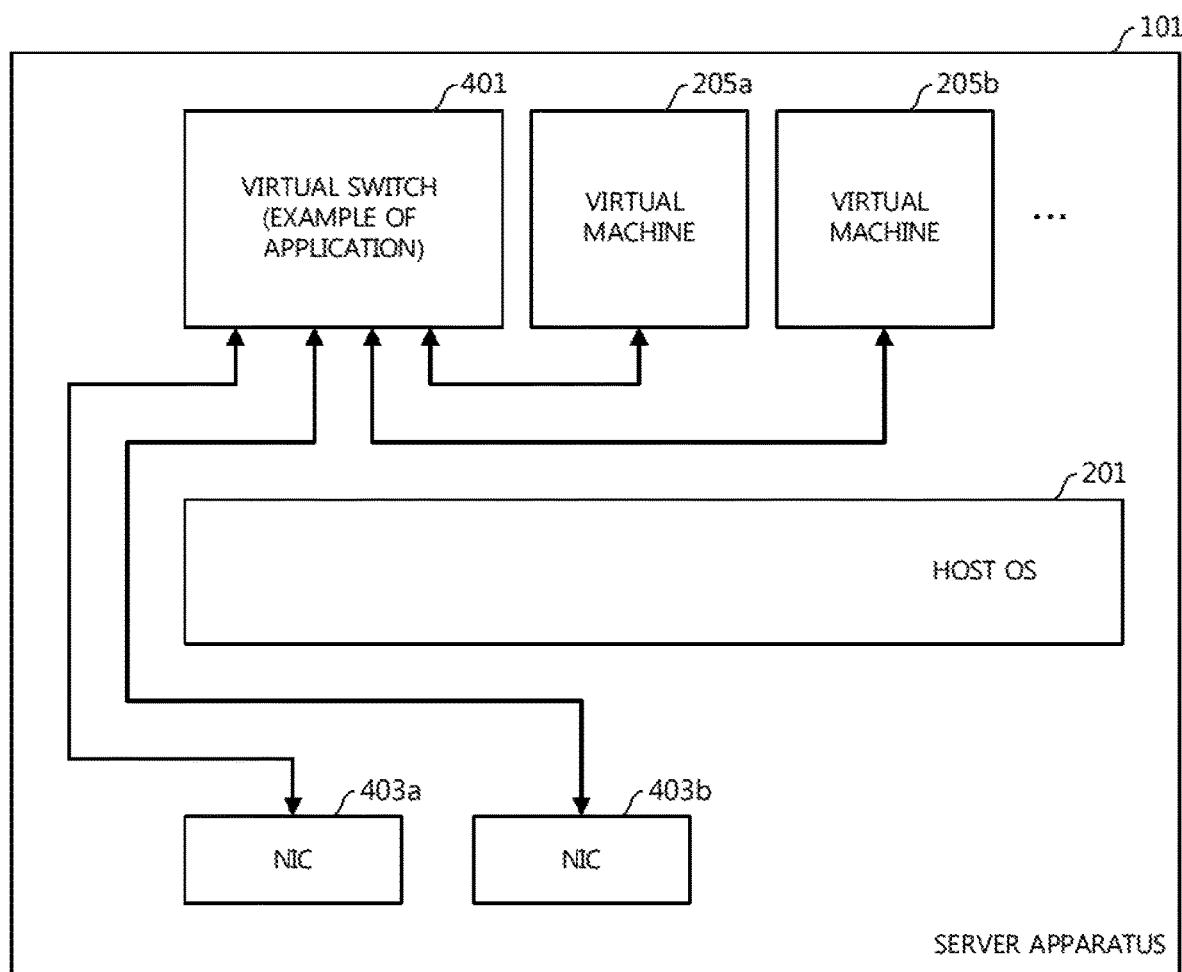
FIG. 4 is a diagram depicting an example of the module configuration of the sever apparatus.

FIG. 4 illustrates another example of the module configuration. The virtual switch 401 relays packets transmitted between the virtual machine 205 and the NIC (Network Interface Card) 403 in a virtualization infrastructure by using a DPDK (Data Plane Development Kit) library and a DPDK driver, for example. The DPDK library is mainly used in order to speed up processing of packets. Therefore, the DPDK driver employs a polling method and provides a network interface and a virtual machine interface.

Here, it is assumed that some of the CPUs of the server apparatus 101 are exclusively allocated to the virtual switch 401. Therefore, the virtual switch 401 occupies some CPUs. FIG. 5 illustrates an example in which a utilization rate of a CPU exclusively used by the virtual switch 401 is measured in the host OS 201. In such an operation mode, it seems that the CPU is always using 100% in the user mode. In other words, it is not possible to distinguish between a case where the load on the virtual switch 401 is high and a case where the load on the virtual switch 401 is low.

In this embodiment, even when CPU utilization of the application 203 cannot be measured accurately in the host OS 201, the load of the application 203 can be estimated more accurately. The virtual switch 401 is an aspect of the application 203. This embodiment may be applied to another application 203.

In this embodiment, an attention is paid to a frequency distribution of execution addresses in a CPU. FIG. 6 illustrates an example of a frequency distribution of execution addresses. When the load of the virtual switch 401 is low, routines related to waiting is mainly executed. Therefore, as illustrated in the lower part, execution addresses concentrate in one place. On the other hand, when the load of the virtual switch 401 is high, in addition to the routines related to waiting, a rate of execution of routines related to transfer processing of packets increases. Therefore, as illustrated in the upper part, execution addresses are spread to plural locations. In this way, a characteristic that execution status of the CPU differs depending on the load is utilized.

Figure 7:
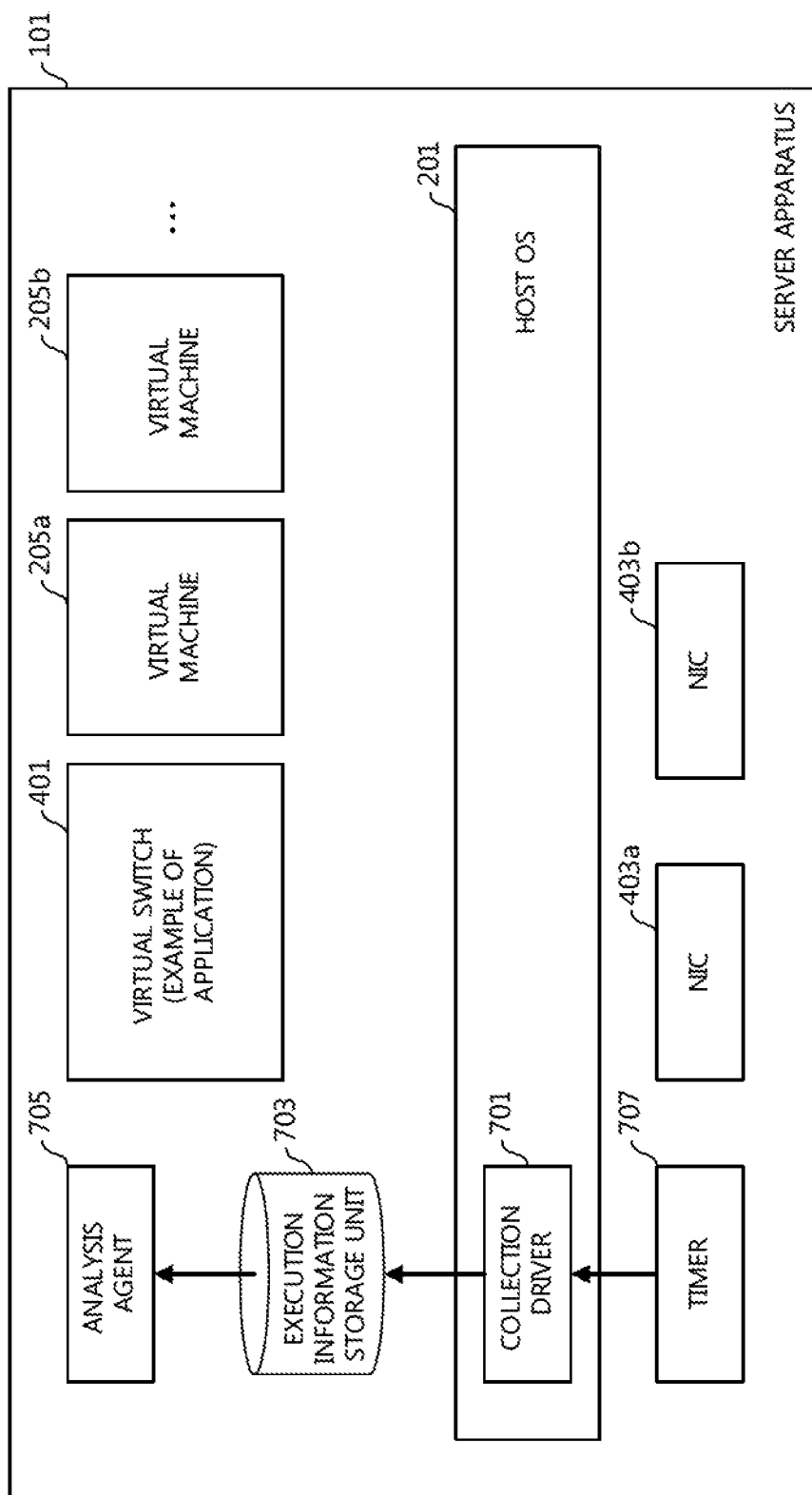
FIG. 7 is a diagram depicting an example of the module configuration of the server apparatus.

FIG. 7 illustrates an example of a module configuration of the server apparatus 101 related to this embodiment. A collection driver 701 provided in the host OS 201 samples program counter values (in other words, execution addresses) of the CPU occupied by the virtual switch 401. The execution address is stored in the execution information storage unit 703 as a log table. An analysis agent 705 analyzes the log table and estimates the load of the virtual switch 401. Incidentally, the collection driver 701 obtains an execution address value at a timing of a hardware interrupt of the timer 707.

Figure 8:
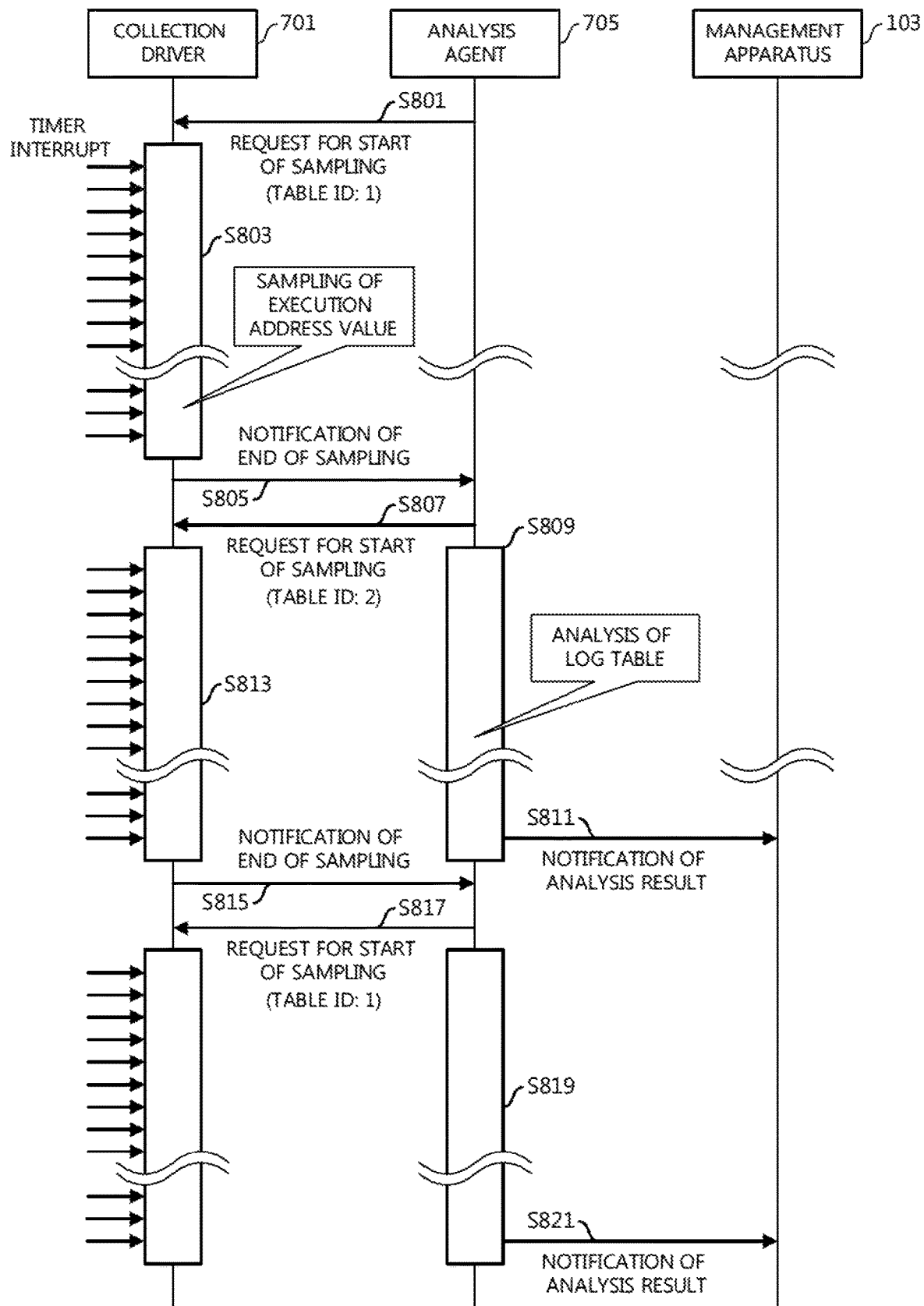
FIG. 8 is a diagram depicting an example of a sequence.

FIG. 8 illustrates an example of a sequence. In this example, two log tables are alternately used so that sampling and analysis are continuously performed.

First, the analysis agent 705 transmits a request for start of sampling to the collection driver 701 (S801). It is assumed that the log table written by the collection driver 701 is designated in the request. For example, assume that table ID: 1 is designated.

When the collection driver 701 receives the request for start of sampling, the collection driver 701 performs sampling of execution address values (S803). One sampling period is, for example, one second. In this example, it is assumed that the collection driver 701 obtains 1000 samples in one sampling period. Therefore, the timer 707 generates a hardware interrupt with a period of 1 millisecond.

When reaching to a timing of an end of sampling, the collection driver 701 sends a notification of end of sampling to the analysis agent 705 (S805). At a timing of completing the sampling, writing to the log table has been completed.

When the analysis agent 705 receives the notification of end of sampling, the analysis agent 705 sends a request for start of the second sampling to the collection driver 701 (S807). Another log table is designated in the request at this time. In this example, it is assumed that the table ID: 2 is designated.

Next, the analysis agent 705 analyzes the log table related to the table ID: 1 (S809). At this time, based on the CPU execution characteristic corresponding to each of the plural load levels, a current load level is specified. Assume that data of the CPU execution characteristic is prepared in advance.

After completing analysis of the log table, the analysis agent 705 sends a notification of an analysis result (for example, the current load level) to the management apparatus 103 (S811).

On the other hand, the collection driver 701 performs the second sampling during this period (S813). The result of the second sampling is written to the log table of table ID: 2. When the second sampling is completed, the collection driver 701 sends a notification of end of sampling to the analysis agent 705 (S815).

When the analysis agent 705 receives the notification of end of the second sampling, the analysis agent 705 sends a request for start of the third sampling to the collection driver 701 (S817). In the request at this time, the table ID: 1 is designated.

Next, the analysis agent 705 analyzes the log table related to the table ID: 2 (S819). After completing analysis of the log table, the analysis agent 705 sends a notification of the analysis result to the management apparatus 103 (S821). Thereafter, the same processing is repeated. The analysis agent 705 may consolidate plural analysis results and send them to the management apparatus 103.

FIG. 9 illustrates an example of the log table. The log table in this example has records corresponding to samples. A record in the log table has a field for storing a sample number and a field for storing an execution address value.

The sample number represents a sequence of sampling and identifies the sample. The execution address value corresponds to a sample in this sampling. In this example, 1000 samples are stored.

Next, the processing in the collection driver 701 will be explained. The collection driver 701 performs start processing and handler processing. In the start processing, sampling starts. In the handler processing, sampling is performed.

Figure 10:
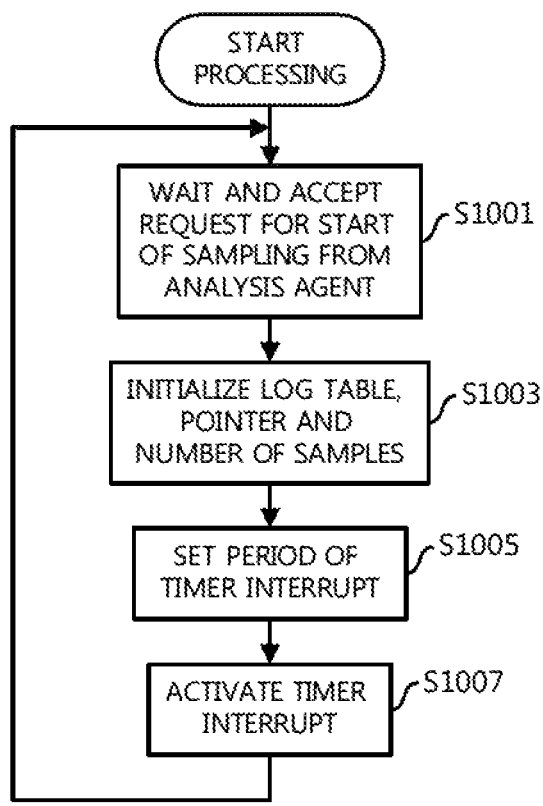
FIG. 10 is a diagram depicting a start processing flow.

FIG. 10 illustrates a start processing flow. The collection driver 701 waits and accepts a request for start of sampling from the analysis agent 705 (S1001). The collection driver 701 initializes the log table designated by the table ID included in the request for start of sampling. Furthermore, the collection driver 701 initializes a pointer pointing a record in which the log table is written and the number of samples (S1003). Specifically, the pointer in the initial state is 1, and the number of samples is zero. The pointer and the number of samples are internal parameters.

The collection driver 701 sets a period of a timer interrupt (S1005). The period of the timer interrupt in this example is one millisecond. Then, the collection driver 701 activates the timer interrupt (S1007). After that, the processing returns to S1001.

Figure 11:
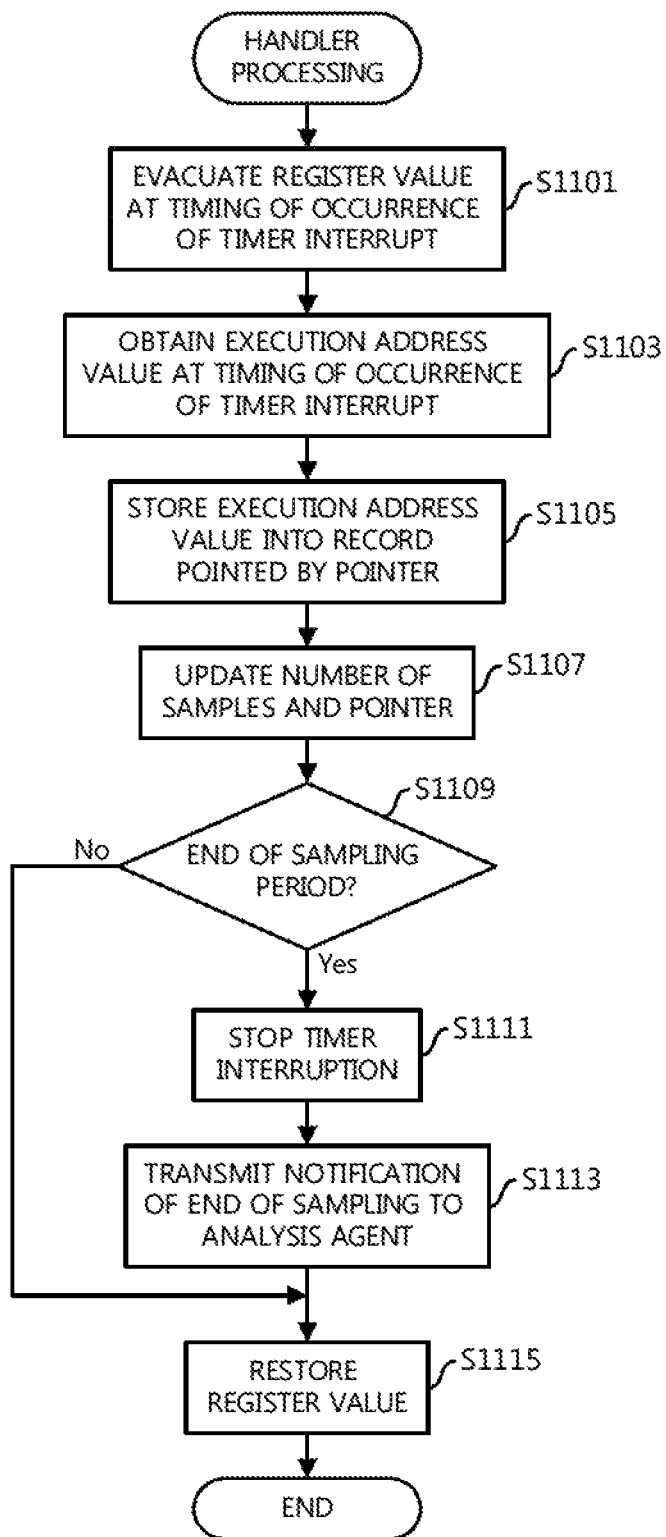
FIG. 11 is a diagram depicting a handler processing flow.

Next, the handler processing will be explained. The handler processing is started when the timer interrupt occurs. FIG. 11 illustrates a handler processing flow. First, the collection driver 701 evacuates a register value at a time of occurrence of the timer interrupt (S1101).

Next, the collection driver 701 obtains an execution address value at the timing of occurrence of the timer interruption (S1103), and stores the execution address value in the record pointed by the pointer (S1105). Then, the collection driver 701 updates the pointer and the number of samples (S1107). Specifically, the collection driver 701 adds 1 to the pointer and adds 1 to the number of samples.

The collection driver 701 determines whether or not the sampling period has ended (S1109). Specifically, the collection driver 701 determines whether or not a predetermined period of time (1 second, in this example) has elapsed from a timing of accepting the request for start of sampling in S1001. Alternatively, the collection driver 701 may determine whether or not the number of samples has reached a predetermined number (1000, in this example).

When it is determined that the sampling period has not ended, the collection driver 701 restores the register value to the original value (S1115), and finishes the handler processing.

On the other hand, when it is determined that the sampling period has ended, the collection driver 701 stops the timer interrupt (S1111) and sends a notification of end of sampling to the analysis agent 705 (S1113). The collection driver 701 restores the register value to the original value (S1115), and finishes the handler processing. The explanation for the collection driver 701 ends.

Figures 12, 13:
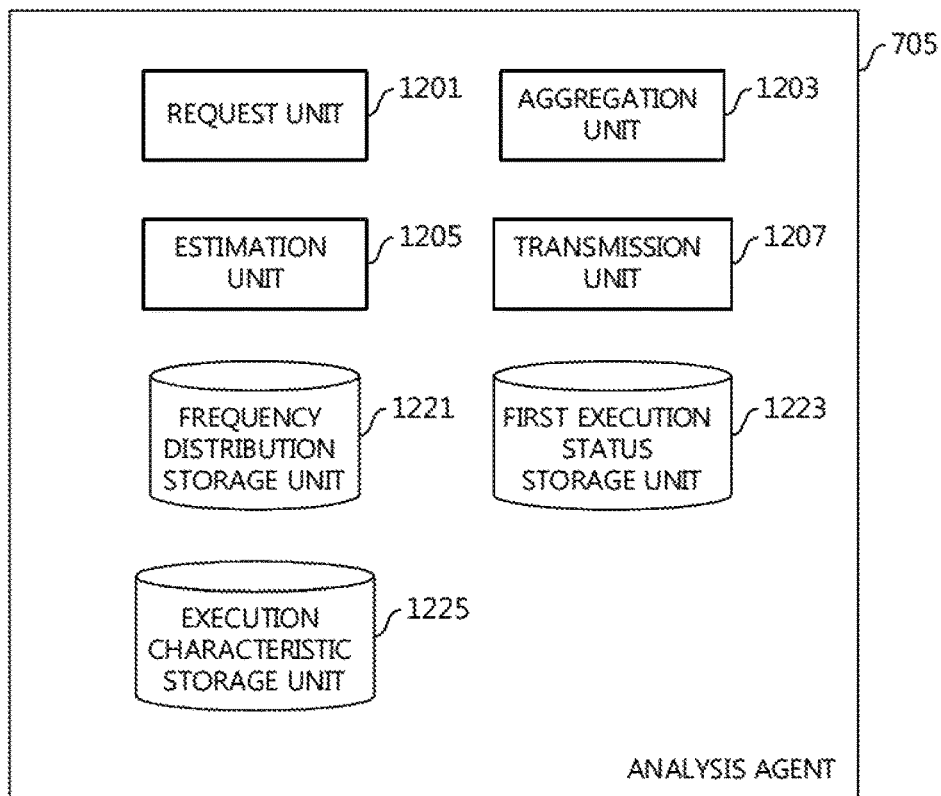
FIG. 12 is a diagram depicting an example of a module configuration of an analysis agent.
FIG. 13 is a diagram depicting an example of a frequency distribution table.

Next, the analysis agent 705 will be explained. FIG. 12 illustrates an example of a module configuration of the analysis agent 705. The analysis agent 705 has a request unit 1201, an aggregation unit 1203, an estimation unit 1205, a transmission unit 1207, a frequency distribution storage unit 1221, a first execution status storage unit 1223, and an execution characteristic storage unit 1225.

The request unit 1201 requests collection driver 701 to start sampling. The aggregation unit 1203 calculates execution status of the CPU based on the execution information (in this example, the log table). In other words, the execution status of the CPU is specified as an aggregation result. The estimation unit 1205 estimates the load of the application 203. The transmission unit 1207 transmits the analysis result to the management apparatus 103.

The frequency distribution storage unit 1221 stores a frequency distribution table. The frequency distribution table will be described later using FIG. 13. The first execution status storage unit 1223 stores execution status data. The execution status data will be described later using FIG. 14. The execution characteristic storage unit 1225 stores an execution characteristic table. The execution characteristic table will be described later using FIG. 15.

The request unit 1201, the aggregation unit 1203, the estimation unit 1205, and the transmission unit 1207 described above are realized by using hardware resources (for example, FIG. 38) and a program for causing the processor to execute the processing described below.

Figures 35, 36, 38:
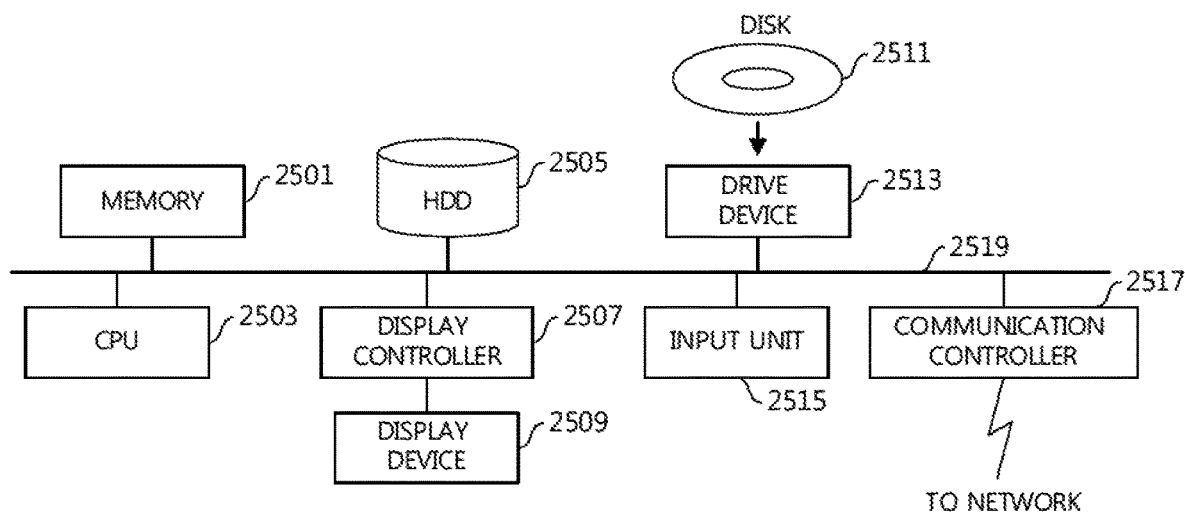
FIG. 35 is a diagram depicting an example of an execution pattern table in the fifth embodiment.
FIG. 36 is a diagram depicting an example of weight data in the fifth embodiment.
FIG. 38 is a diagram depicting a functional block diagram of a computer.

The frequency distribution storage unit 1221, the first execution status storage unit 1223, and the execution characteristic storage unit 1225 described above are realized by using hardware resources (for example, FIG. 38).

FIG. 13 illustrates an example of the frequency distribution table. The classes in this frequency distribution correspond to the ranges of the execution address. In the following, the range of the execution address is called a block. The frequency distribution table in this example has records corresponding to blocks. The record of the frequency distribution table has a field in which a block range is stored, a field in which the number of samples is stored, and a field in which an occupancy rate is stored.

In this example, a block range (that is, a start address and an end address) is illustrated as data designating a block, but since a block in this embodiment has a fixed size, only one of the start address and the end address of the block may be used as the data designating the block. The number of samples is the number of execution address values included in the block range. The occupancy rate is a rate of the number of samples of the block to the total number of samples.

For example, the illustrated first record represents that the number of execution address values included in a block corresponding to addresses "0x004062c0 to 0x004062ff" is "120". Moreover, an occupancy rate of the sample is "12%".

FIG. 14 illustrates an example of execution status data. The execution status data is generated based on the aforementioned frequency distribution. In the example of FIG. 14, the occupancy rates of the block having the largest number of samples, the block having the second largest number of samples and the block having the third largest number of samples are extracted. In addition, the number of blocks whose number of samples exceeds a reference (in other words, a standard) is counted. These occupancy rates and the numbers of blocks are examples of features related to the frequency distribution. Other characteristics related to the frequency distribution may be used as the execution status data.

FIG. 15 illustrates an example of an execution characteristic table. The execution characteristic table is prepared in advance. Contents of the execution characteristic table are set with reference to the execution status of the CPU when the management apparatus 103 sends a request related to a known load to the application 203, for example.

The execution characteristic table in this example has a record corresponding to the execution characteristic. The record of the execution characteristic table includes a field in which a load level is stored, a field in which CPU utilization of the application 203 is stored. The record of the execution characteristic table also includes a field in which a block range is stored and a field in which an occupancy rate is stored, for a first feature block to a third feature block. The record also has a field in which the number of blocks whose number of samples exceeds a reference is stored.

The load level represents degrees of loads in the execution characteristic in stages from "1" to "7". In this example, it is assumed that the load is large in ascending order. Moreover, each load level corresponds to the illustrated CPU utilization of the application 203. For example, the load level "3" corresponds to the CPU utilization "40%" of the application 203. The load level "7" corresponds to a state in which the load of the application 203 exceeds a limit.

Figure 16:
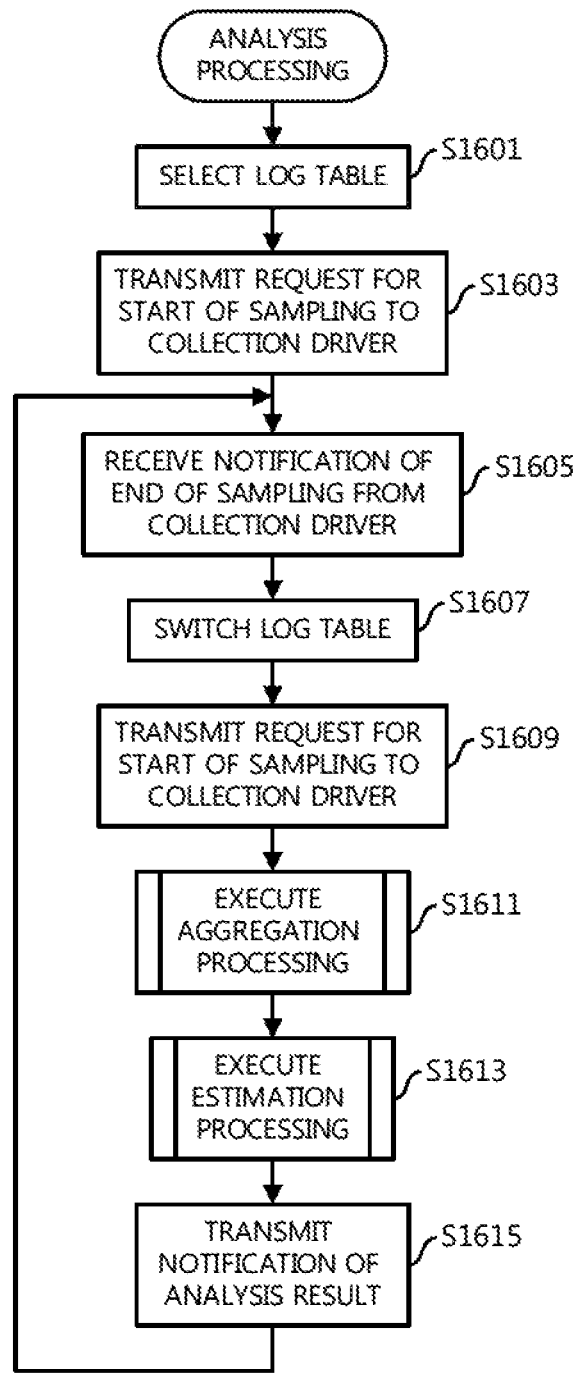
FIG. 16 is a diagram depicting an analysis processing flow.

Next, analysis processing in the analysis agent 705 will be explained. FIG. 16 illustrates an analysis processing flow. The request unit 1201 selects a log table to be used first (S1601). The request unit 1201 sends a request for start of sampling (including an ID of the selected log table) to the collection driver 701 (S1603).

Thereafter, the request unit 1201 waits and receives a notification of end of sampling from the collection driver 701 (S1605). Then, the request unit 1201 switches the log table (S1607) and sends a request for start of sampling (including an ID of the switched log table) to the collection driver 701 (S1609).

Figure 17:
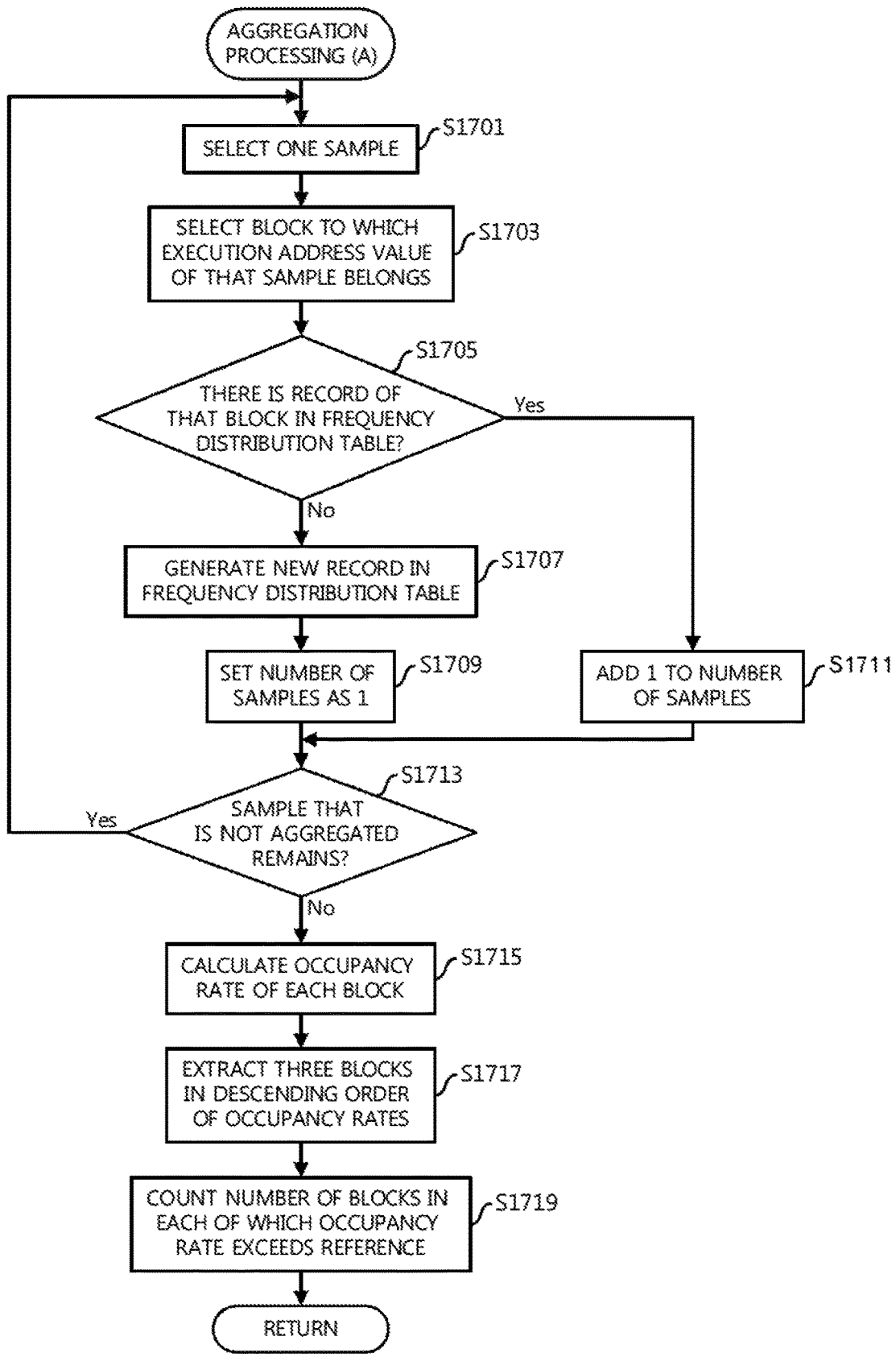
FIG. 17 is a diagram depicting an aggregation processing flow (A)

Next, the aggregation unit 1203 executes aggregation processing (S1611). In this embodiment, aggregation processing (A) is executed. FIG. 17 illustrates an aggregation processing (A) flow. The aggregation unit 1203 selects one sample in the log table recorded by sampling (S1701). For example, the aggregation unit 1203 selects samples according to sampling order.

The aggregation unit 1203 selects a block to which an execution address value of the sample belongs (S1703). For example, by masking predetermined lower bits in the execution address value, a start address of the block to which it belongs is identified.

The aggregation unit 1203 determines whether or not there is a record of the specified block in the frequency distribution table (S1705). When it is determined that there is no record of the block in the frequency distribution table, the aggregation unit 1203 newly generates a record of the block in the frequency distribution table (S1707). Then, the aggregation unit 1203 sets 1 in a field for storing the number of samples of the record (S1709).

On the other hand, when it is determined that there is a record of the block in the frequency distribution table, the aggregation unit 1203 adds 1 to the number of samples in the record (S1711).

Then, the aggregation unit 1203 determines whether or not any sample that has not yet been aggregated in S1701 remains (S1713). When it is determined that an unaggregated sample remains, the processing returns to the processing of S1701, and the aforementioned processing is repeated.

On the other hand, when it is determined that all the samples are aggregated, the aggregation unit 1203 calculates an occupancy rate of each block (S1715). Specifically, the occupancy rate is calculated by dividing the number of samples in the block by the total number of samples. The occupancy rate is set in the record of the frequency distribution table.

The aggregation unit 1203 extracts three blocks in descending order of occupancy rates (S1717). Then, the aggregation unit 1203 sets ranges and occupancy rates of these blocks in the execution status data stored in the first execution status storage unit 1223. Furthermore, the aggregation unit 1203 counts the number of blocks whose occupancy rate exceeds a reference (S1719). The number of blocks whose occupancy rate exceeds the reference is also set in the execution status data stored in the first execution status storage unit 1223. Upon completion of the aggregation processing (A), the processing returns to the calling-source analysis processing.

Figure 18:
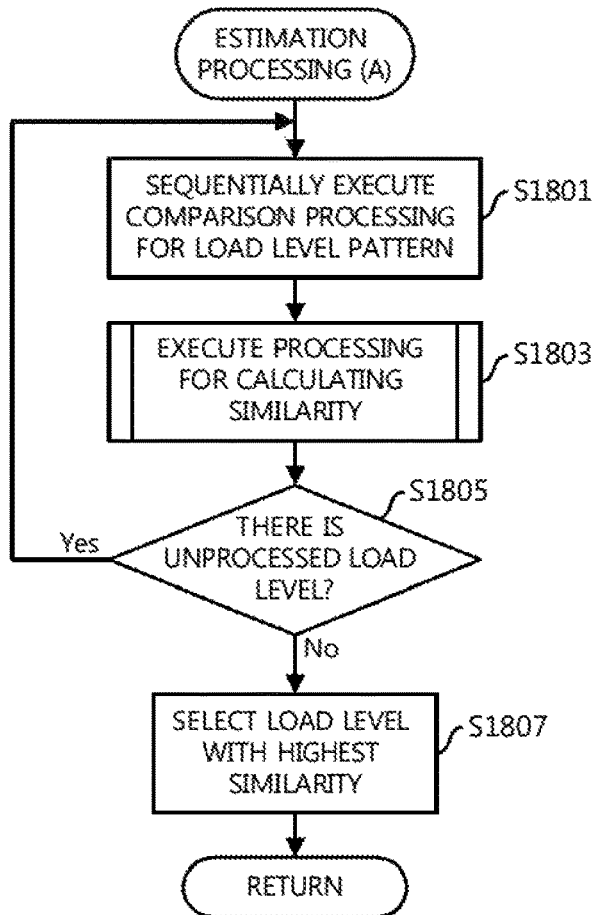
FIG. 18 is a diagram depicting an estimation processing flow (A)

Returning to the explanation of FIG. 16, the estimation unit 1205 executes estimation processing (S1613). In this embodiment, estimation processing (A) is executed. FIG. 18 illustrates an estimation processing (A) flow. The estimation unit 1205 sequentially executes comparison processing for load level patterns in the execution characteristic table (S1801). For example, the estimation unit 1205 processes the load level patterns in ascending order.

The estimation unit 1205 executes similarity calculation processing with the load level selected as a comparison target with respect to the execution status data (S1803). In the similarity calculation processing, the similarity between execution status and the execution characteristic is calculated.

Figure 19:
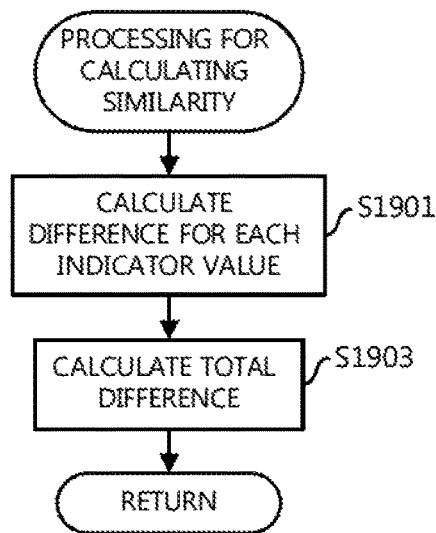
FIG. 19 is a diagram depicting a similarity calculation processing flow.

FIG. 19 illustrates a similarity calculation processing flow. The estimation unit 1205 calculates a difference for each indicator value (S1901). In this example, an occupancy rate in a block with the largest number of samples, an occupancy rate in a block with the second largest number of samples, an occupancy rate in a block with the third largest number of samples and the number of blocks whose occupancy rate exceeds the reference correspond to indicator values. For each indicator value, the difference between the indicator value in the execution status and the same kind of indicator value in the execution characteristic is calculated. However, only each occupancy rate may be used as an indicator value except for the number of blocks.

The estimation unit 1205 calculates an overall difference based on the difference for each indicator value (S1903). The method for calculating the overall difference based on the difference for each indicator value may be a conventional technique. For example, a sum of squares of differences may be calculated, and a square root of the sum of squares may be calculated. When the overall difference is small, it means that the similarity is high. Upon completion of the similarity calculation processing, the processing returns to the calling-source estimation processing (A).

Returning to the explanation of FIG. 18, the estimation unit 1205 determines whether or not there is an unprocessed load level (S1805). When it is determined that there is an unprocessed load level, the processing returns to the processing of S1801 and the aforementioned processing is repeated.

On the other hand, when it is determined that there is no unprocessed load level, the estimation unit 1205 selects a load level having the highest similarity (S1807). Upon completion of the estimation processing (A), the processing returns to the calling-source analysis processing.

Returning to the description of FIG. 16, the transmission unit 1207 transmits a notification of the analysis result (S1615). Specifically, a load level (or application CPU utilization corresponding to the load level) is notified. Then, the processing returns to S1605.

According to this embodiment, it is possible to grasp a load of a predetermined program more easily.

In addition, based on a characteristic that execution parts differ depending on a magnitude of the load, there is also an aspect that it is possible to estimate the load more accurately.

Embodiment 2

In the aforementioned embodiment, an example of estimating a load level that is the most similar has been described. In this embodiment, an example in which a degree of a load (application CPU utilization) corresponding to an internally dividing point of two load levels is estimated will be described.

Figure 20:
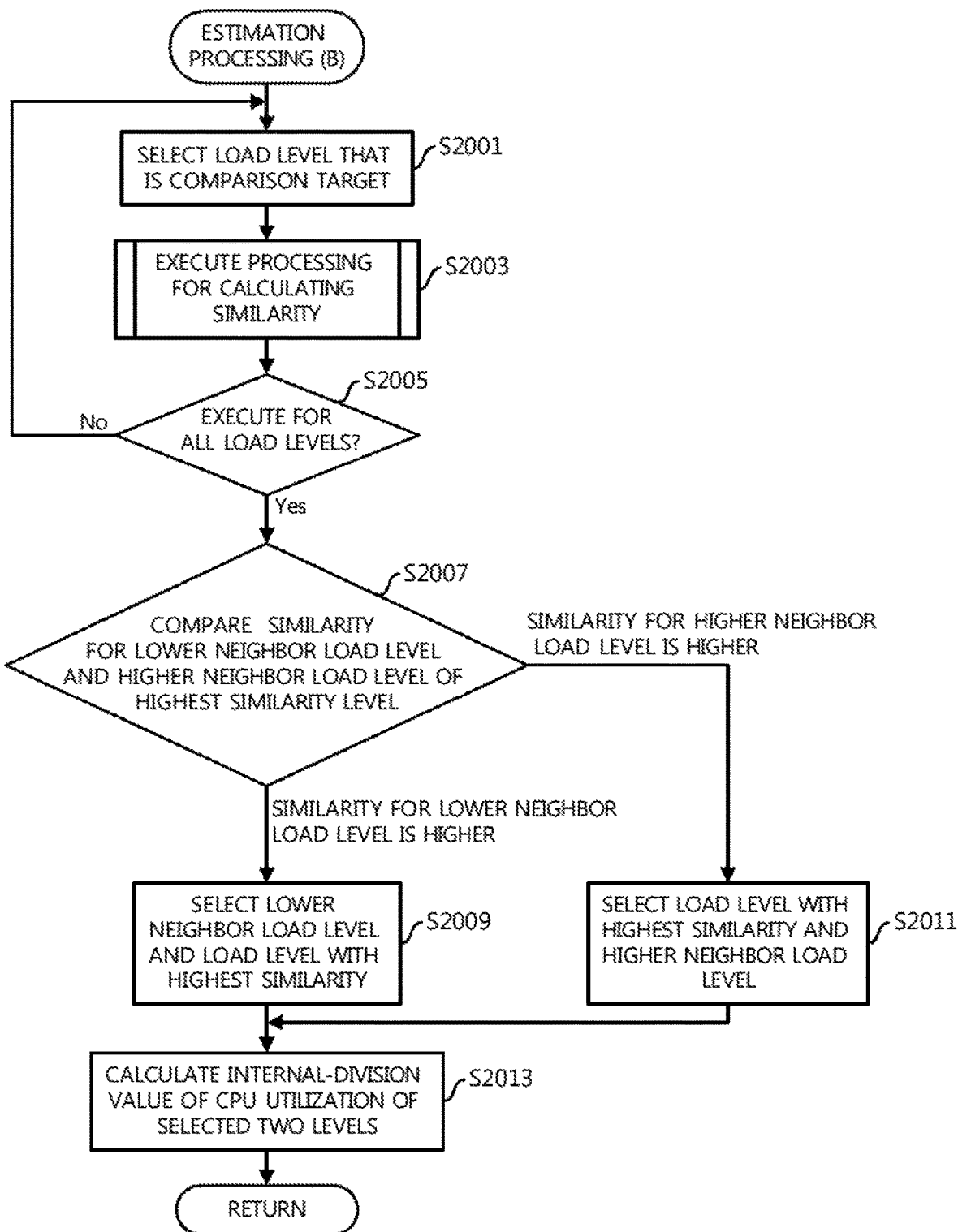
FIG. 20 is a diagram depicting an estimation processing flow (B)

In this embodiment, estimation processing (B) is executed in place of the estimation processing (A). FIG. 20 illustrates an estimation processing (B) flow. In the case of the estimation processing (A), order of patterns in the execution characteristic table does not have to be arranged in ascending order of FIG. 15. In the estimation processing (B), it has to be arranged in ascending order (or descending order). The estimation unit 1205 executes the similarity calculation processing for the load level selected as a comparison target, with respect to the execution status data (S2001, S2003). This similarity calculation processing is the same as the similarity calculation processing in the case of the estimation processing (A).

The estimation unit 1205 determines whether or not the similarity calculation processing has been completed for all load levels in the pattern table (S2005). When it is determined that there is an unprocessed indicator value, the processing returns to the processing of S2001, and the aforementioned processing is repeated. On the other hand, when it is determined that there is no unprocessed indicator value, the estimation unit 1205 compares similarity between the lower neighbor level and the higher neighbor level of the highest similarity level (S2007). For example, when level 4 has the highest similarity, similarity between level 3 and level 5 is compared. As a result of the comparison, when similarity of the level one level lower is high, the level with the highest similarity and the level one level lower are selected (S2009). If similarity of the level one level higher is higher, the level with the highest similarity and the level one level higher are selected (S2011).

Next, the estimation unit 1205 calculates a value obtained by internally dividing CPU utilization represented by execution characteristics of the selected two levels by similarity of each level as CPU utilization for the execution status data (S2013). For example, assume that a level with the highest similarity is 4, CPU utilization for that level is S, similarity for that level is X, the level selected by the comparison in S2007 is 5, CPU utilization for the selected level is U, and the similarity for the selected level is Y. In this case, the application CPU utilization T in the execution status is obtained by dividing $X*S+Y*U$ by $(X+Y)$.

Upon completion of the estimation processing (B), the processing returns to the calling-source analysis processing.

According to this embodiment, it is possible to grasp a load of the application 203 with higher precision.

Embodiment 3

In the embodiments described above, examples in which a block is an equally divided range are described. In this embodiment, an example in which a block is set according to a spread of execution addresses included within a predetermined upper limit spread will be described.

Figure 21:
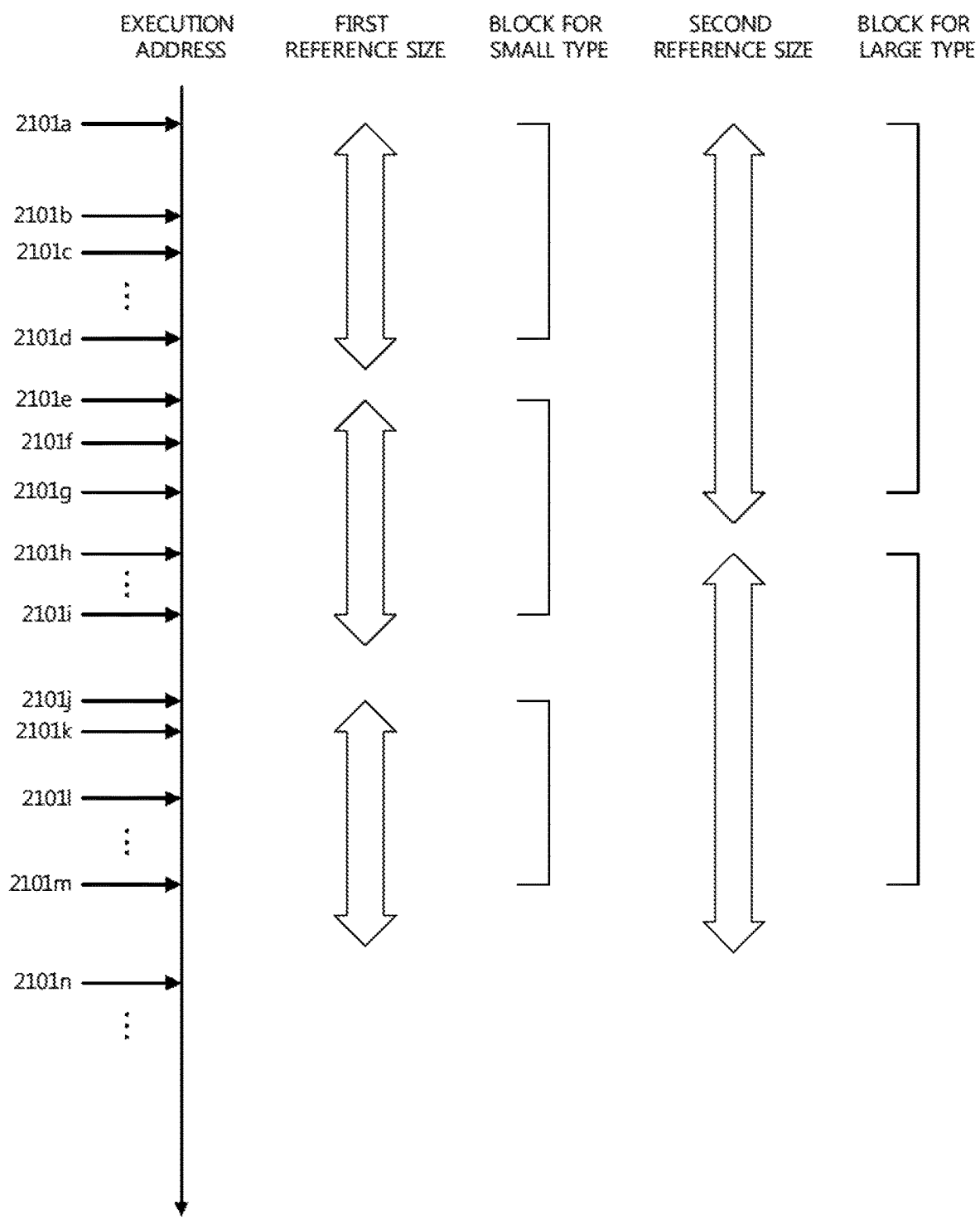
FIG. 21 is a diagram depicting an example of blocks in a third embodiment.

FIG. 21 illustrates an example of a block in the third embodiment. An arrow 2101 represents an execution address. In this example, the upper limit spread of a block is represented by a first reference size and a second reference size.

The first reference size is set with reference to a size of a function having a relatively small code size, for example. Then, the spread of the execution addresses that fall within a distance that does not exceed the first reference size is regarded as a block. This block is called a small-type block. In this example, a range from arrow 2101*a* to arrow 2101*d* is assumed to be the first small-type block. Likewise, a range from arrow 2101*e* to arrow 2101*i* is assumed to be the second small-type block. Likewise, a range from arrow 2101*j* to arrow 2101*m* is assumed to be the third small-type block.

The second reference size is set with reference to a size of a function having a relatively large code size, for example. Then, the spread of the execution addresses that fall within a distance that does not exceed the second reference size is regarded as a large-type block. In this example, a range from arrow 2101*a* to arrow 2101*g* is assumed to be the first large-type block. Likewise, the range from arrow 2101*h* to arrow 2101*m* is assumed to be the second large-type block.

Figures 22, 23A:
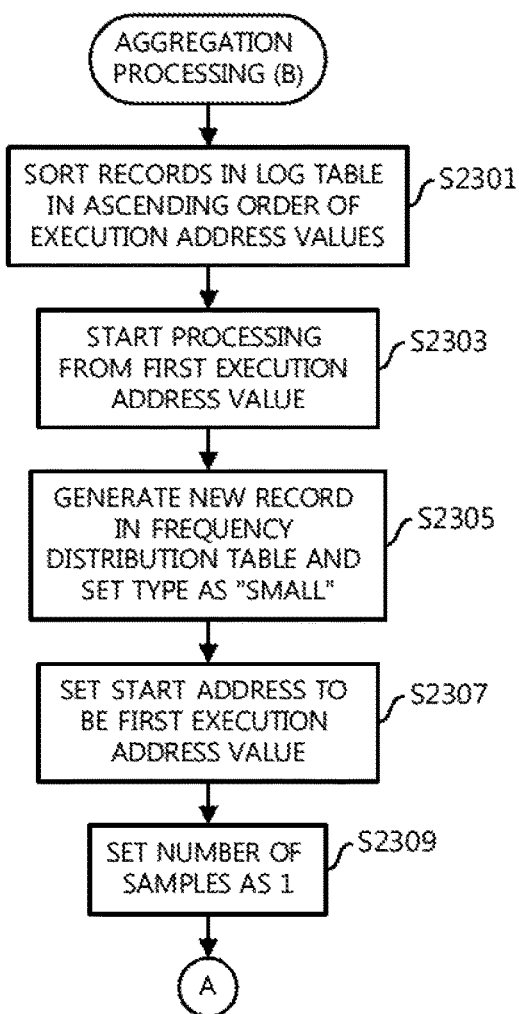
FIG. 22 is a diagram depicting an example of the frequency distribution table in the third embodiment.
FIG. 23A is a diagram depicting an aggregation processing flow (B)

FIG. 22 illustrates an example of the frequency distribution table in the third embodiment. The frequency distribution table in this example has records corresponding to small-type blocks and large-type blocks. The record of the frequency distribution table has a field in which a code value indicating a type is stored, a field in which a start address is stored, a field in which the size is stored, a field in which the number of samples is stored, and a field in which the occupancy rate is stored.

A block type is distinguished by a code value representing a type. A start address represents a start position of a block. Instead of a size, an end address may be stored. The number of samples is the number of execution address values included in the block range. The occupancy rate is a rate of the number of samples of the block to the total number of samples.

In this embodiment, aggregation processing (B) is executed instead of the aggregation processing (A). FIG. 23A to FIG. 23D illustrate an aggregation processing (B) flow. The aggregation unit 1203 sorts records in the log table in ascending order of execution address values (S2301).

The aggregation unit 1203 starts processing from the first execution address value in the sort result (S2303). The aggregation unit 1203 generates a new record in the frequency distribution table and sets "small" in a type field of the record (S2305). The aggregation unit 1203 sets the first execution address value in a field of the start address in the record (S2307). Furthermore, the aggregation unit 1203 sets 1 in a field of the number of samples in the record (S2309). The processing shifts to S2311 illustrated in FIG. 23B by way of terminal A.

Figure 23B:
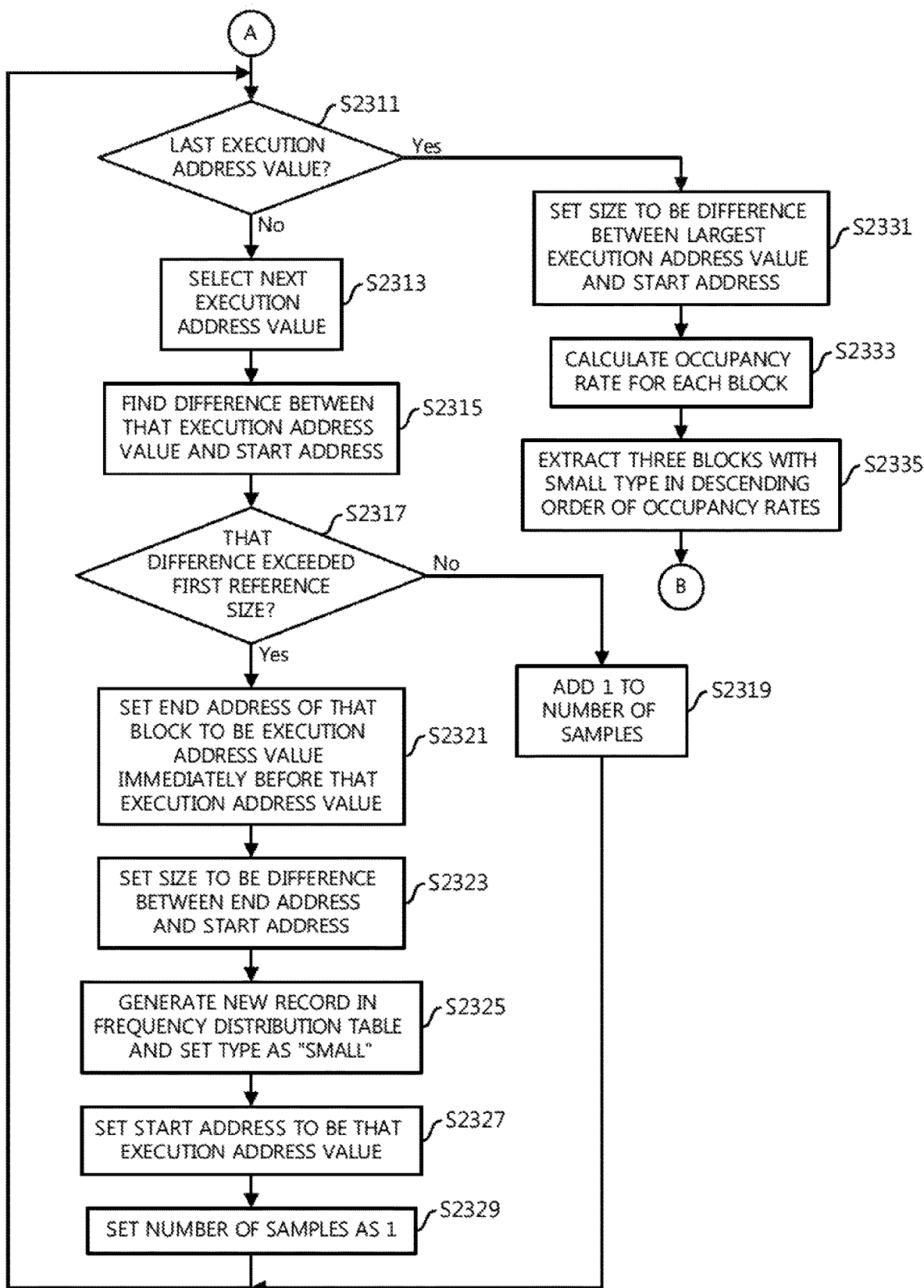
FIG. 23B is a diagram depicting the aggregation processing flow (B)

Shifting to the description of FIG. 23B, the aggregation unit 1203 determines whether it is the last execution address value (S2311).

When it is not the last execution address value, the aggregation unit 1203 selects the next execution address value (S2313), and obtains a difference between the execution address value and the start address (S2315). Then, the aggregation unit 1203 determines whether or not the difference exceeds the first reference size (S2317).

When it is determined that the difference between the execution address value selected in S2313 and the start address does not exceed the first reference size, the aggregation unit 1203 adds 1 to the number of samples in the record being generated (the record set in S2305 of FIG. 23A or the record set in S2325 that will be described later) (S2319). After that, the processing returns to the processing of S2311, and the aforementioned processing is repeated.

On the other hand, when it is determined that the difference between the execution address value selected in S2313 and the start address exceeds the first reference size, the aggregation unit 1203 sets the end address of the block to be an execution address value immediately before that execution address value (S2321). The aggregation unit 1203 sets a difference between the end address and the start address in a size field of the record being generated (S2323).

The aggregation unit 1203 generates a new record in the frequency distribution table and sets "small" in a type field of the record (S2325). The aggregation unit 1203 sets the execution address value selected in the processing of the latest S2313 in a field of the start address in the new record (S2327). The aggregation unit 1203 sets 1 in a field of the number of samples in the record (S2329). Thereafter, the processing returns to the processing of S2311, and the aforementioned processing is repeated.

Returning to the description of S2311, in S2311, when it is determined that there is no next execution address value, that is, when the processing relating to the largest execution address value has been completed, the aggregation unit 1203 sets a difference between the largest execution address value and the start address in a size field in the record being generated (S2331).

Then, the aggregation unit 1203 calculates an occupancy rate of each small-type block (S2333). Specifically, by dividing the number of samples in the block by the total number of samples, the occupancy rate in the block is obtained. The occupancy rate is set in the record of the frequency distribution table.

The aggregation unit 1203 extracts three small-type blocks in order of the occupancy rates (S2335). Then, the aggregation unit 1203 sets ranges and occupancy rates of these blocks in the execution status data stored in the first execution status storage unit 1223. The processing for the small-type block ends. Then, by way of terminal B, the processing shifts to S2337 illustrated in FIG. 23C. It is to be noted that the execution status data in this example includes extracted data of three small-type blocks having a high occupancy rate and extracted data of three large-type blocks having a high occupancy rate. An example of this execution status data is not illustrated.

Figure 23C:
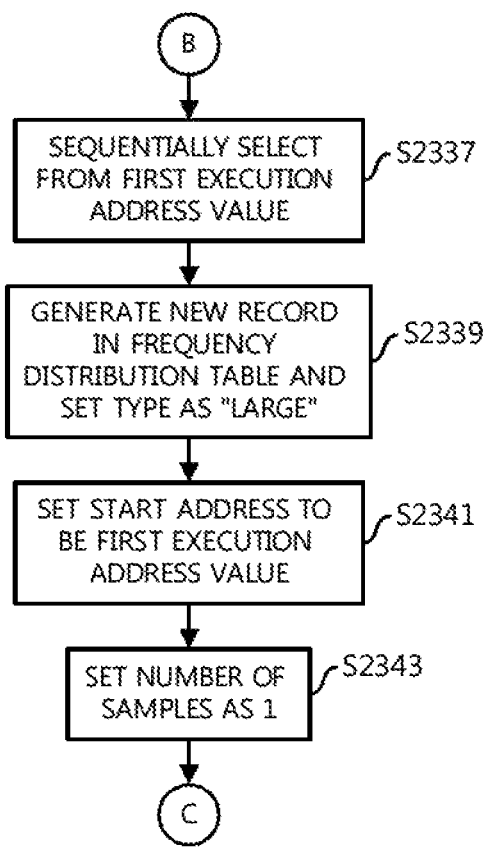
FIG. 23C is a diagram depicting the aggregation processing flow (B)

Shifting to the explanation of FIG. 23C, processing related to large-type blocks is performed in the following. The aggregation unit 1203 sequentially selects from the first execution address value in the sort result and performs processing (S2337). The aggregation unit 1203 generates a new record in the frequency distribution table and sets "large" in a type field of the record (S2339). The aggregation unit 1203 sets the first execution address value in a field of the start address in the record (S2341). The aggregation unit 1203 sets 1 in a field of the number of samples in the record (S2343). The processing shifts to S2345 illustrated in FIG. 23D by way of terminal C.

Figure 23D:
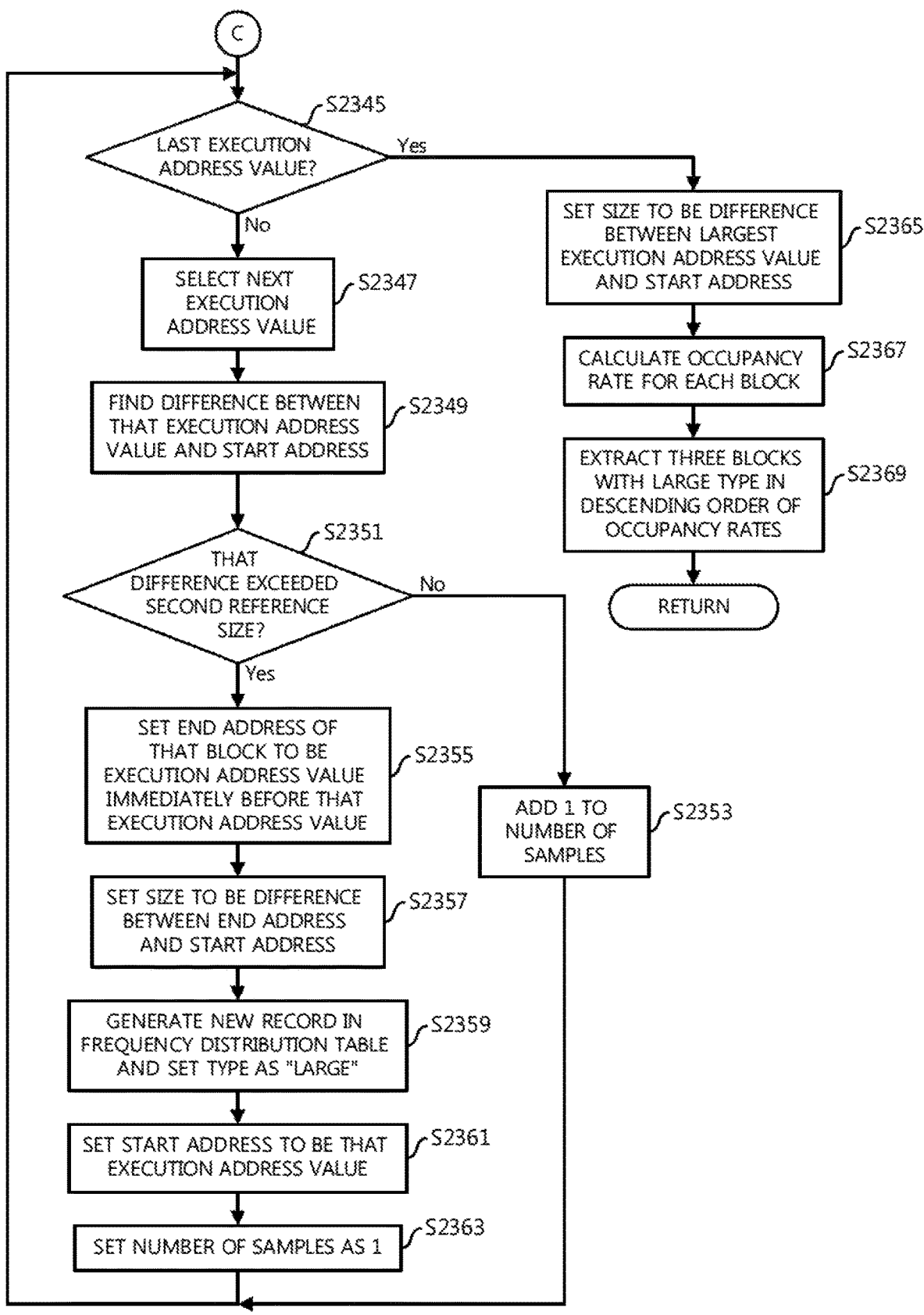
FIG. 23D is a diagram depicting the aggregation processing flow (B)

Shifting to the explanation for FIG. 23D, the processing from S2345 to S2349 is the same as the processing from S2311 to S2315 illustrated in FIG. 23B.

The aggregation unit 1203 determines whether or not a difference between the execution address value selected in S2347 and the start address exceeds the second reference size (S2351). When it is determined that the difference does not exceed the second reference size, the aggregation unit 1203 adds 1 to the number of samples in the record being generated (the record set in S2339 of FIG. 23C or the record set in S2359 described later) (S2353). Then, returning to the processing of S2345, the aforementioned processing is repeated.

On the other hand, the processing in S2355 and S2357 in the case where it is determined that the difference exceeds the second reference size is the same as the processing in S2321 and S2323 illustrated in FIG. 23B.

The aggregation unit 1203 generates a new record in the frequency distribution table and sets "large" in a type field of the record (S2359). The aggregation unit 1203 sets the execution address value selected in the latest S2347 processing in a field of the start address in the new record (S2361). The processing of S2363 is the same as the processing of S2329 illustrated in FIG. 23B. Thereafter, the processing returns to the processing of S2345, and the aforementioned processing is repeated.

In S2345, when it is determined that there is no next execution address value, that is, when the processing relating to the largest execution address value has been completed, the aggregation unit 1203 sets a difference between the largest execution address value and the start address in a field of the size in the record being generated (S2365).

The aggregation unit 1203 calculates an occupancy rate for each large-type block (S2367). Specifically, the occupancy rate is obtained by dividing the number of samples in the block by the total number of samples. The occupancy rate in the block is set in a record of the frequency distribution table.

The aggregation unit 1203 extracts three large-type blocks in descending order of occupancy rates (S2369). Then, the aggregation unit 1203 sets ranges and occupancy rates of these blocks as the execution status data to be stored in the first execution status storage unit 1223. Upon completion of the aggregation processing (B), the analysis agent 705 starts estimation processing.

FIG. 24 illustrates an example of an execution characteristic table according to the third embodiment. The execution characteristic table in this example has a record corresponding to the execution characteristic. The record of the execution characteristic table includes a field in which a load level is stored, a field in which CPU utilization of the application 203 is stored. The record of the execution characteristic table also includes a field in which a type is stored, a field in which a start address is stored, a field in which a size is stored and a field in which an occupancy rate is stored, for a first feature block to a third feature block. Each occupancy rate corresponds to an indicator value.

In this embodiment, either the estimation processing (A) or the estimation processing (B) may be applied. Regardless of them, the same kind of indicator values, that is, occupancy rates in a common block are targets to be compared.

According to this embodiment, it becomes easy to distinguish a load state based on execution frequencies of portions expected to be the function of the application 203.

In addition, it becomes easier to distinguish a load state based on execution frequencies of portions expected to be a function with a large code size and a function with a small code size.

Embodiment 4

In the aforementioned embodiment, an example in which analysis is performed based on a frequency distribution of execution addresses has been explained. In this embodiment, an example in which analysis is performed based on execution frequencies of functions will be explained.

Figures 25, 26:
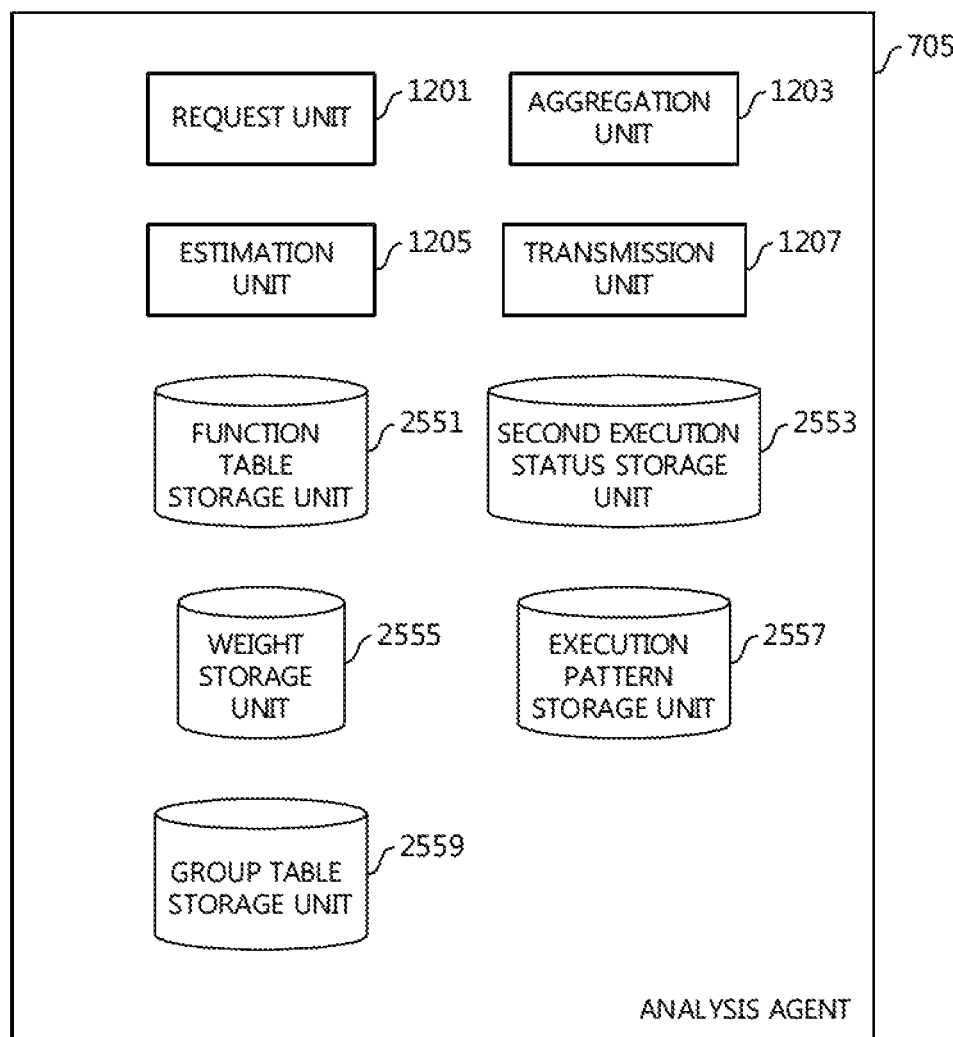
FIG. 25 is a diagram depicting an example of the module configuration of the analysis agent in a fourth embodiment.
FIG. 26 is a diagram depicting an example of a function table.

FIG. 25 illustrates an example of module configuration of the analysis agent 705 in the fourth embodiment. The analysis agent 705 includes a request unit 1201, an aggregation unit 1203, an estimation unit 1205, a transmission unit 1207, a function table storage unit 2551, a second execution status storage unit 2553, a weight storage unit 2555, an execution pattern storage unit 2557 and a group table storage unit 2559.

The function table storage unit 2551 stores a function table. The function table will be described later with reference to FIG. 26. The second execution status storage unit 2553 stores a second execution status table. The second execution status table will be described later with reference to FIG. 27. The weight storage unit 2555 stores weight data. The weight data will be described later with reference to FIG. 30. The execution pattern storage unit 2557 stores an execution pattern table. The execution pattern table will be described later with reference to FIG. 29. The group table storage unit 2559 stores a group table. The group table will be described later with reference to FIG. 32 in the fifth embodiment.

The function table storage unit 2551, the second execution status storage unit 2553, the weight storage unit 2555, the execution pattern storage unit 2557, and the group table storage unit 2559 described above are realized by using hardware resources (for example, FIG. 38).

FIG. 26 illustrates an example of the function table. The function table in this example has records corresponding to functions. The record of the function table has a field in which a function name is stored, a field in which the first address is stored, and a field in which a size is stored.

The first address represents a position at which a program of the function starts. The size is a size of the program of the function. Instead of the function table, the data of program arrangement included in the application 203 may be used.

FIG. 27 illustrates an example of the second execution status table. The second execution status table in this example has a record corresponding to an executed function. The record of the second execution status table has a field in which a function name is stored, a field in which the number of samples is stored, and a field in which an occupancy rate is stored.

The function name identifies an executed function. The number of samples is the number of execution address values included in a program range of the function. The occupancy rate is a rate of the number of samples of the function to the total number of samples.

Figure 28:
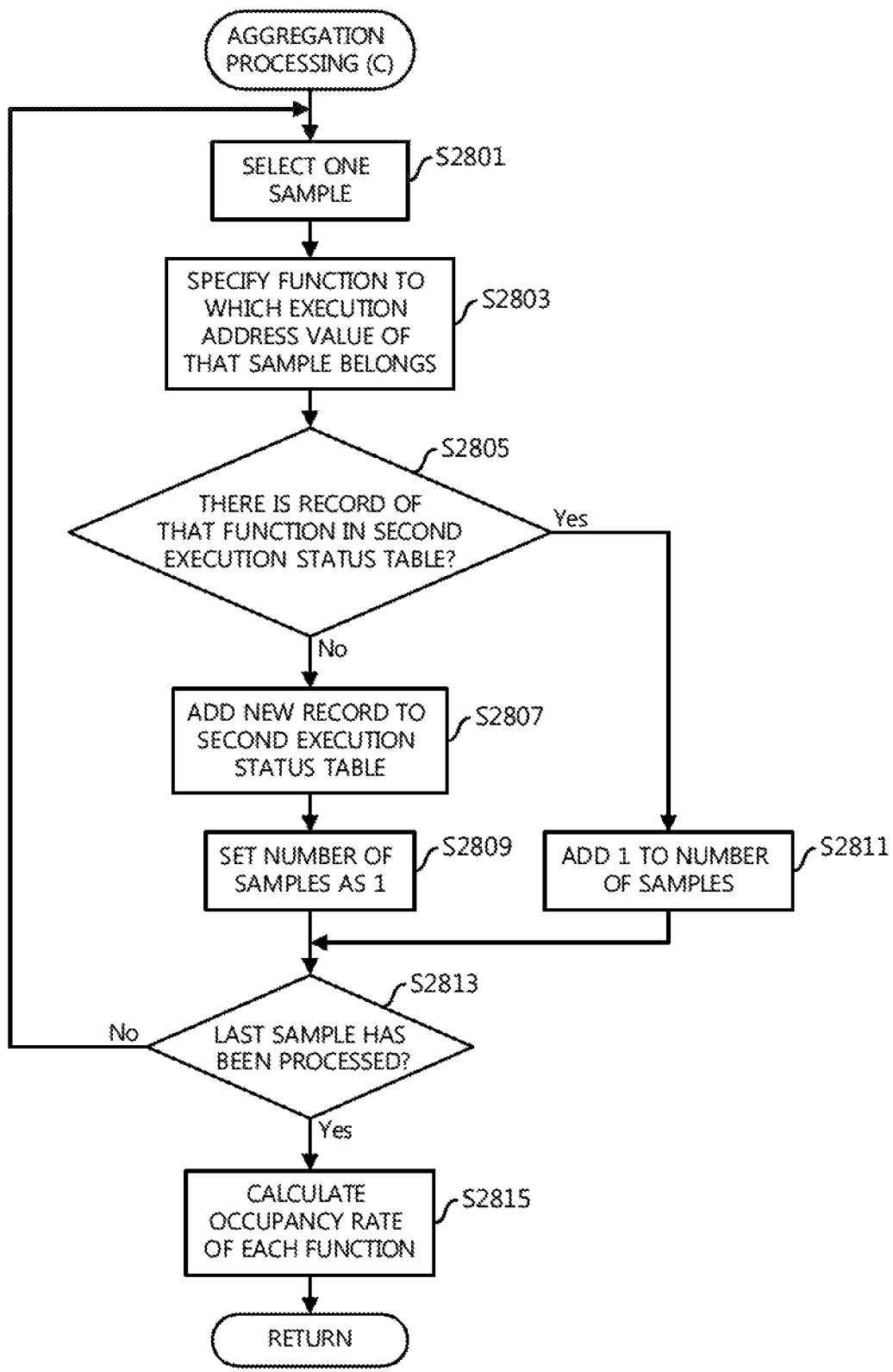
FIG. 28 is a diagram depicting an example of an aggregation processing flow (C)

In this embodiment, the aggregation processing (C) is executed in S1611 illustrated in FIG. 16. FIG. 28 illustrates an aggregation processing (C) flow. The aggregation unit 1203 sequentially selects samples from the first (S2801), and specifies a function to which an execution address value of the sample belongs based on the function table (S2803).

The aggregation unit 1203 determines whether or not there is a record of that function in the second execution status table (S2805). When it is determined that there is no record of the function in the second execution status table, the aggregation unit 1203 adds the record of that function to the second execution status table (S2807). The aggregation unit 1203 sets 1 in a field for storing the number of samples of the record (S2809).

On the other hand, when it is determined that there is a record of the function in the second execution status table, the aggregation unit 1203 adds 1 to the number of samples in the record (S2811).

Then, the aggregation unit 1203 determines whether the last sample of samples to be processed has been selected in S2801 (S2813). When the last sample of samples to be processed has not been selected in S2801, the processing returns to the processing of S2801 and the aforementioned processing is repeated.

On the other hand, when it is determined that the last sample of samples to be processed has been selected, the aggregation unit 1203 calculates an occupancy rate in each function (S2815). Specifically, the occupancy rate is obtained by dividing the number of samples in the function by the total number of samples. The occupancy rate is set in a record of the second execution status table. Upon completion of the aggregation processing (C), the processing returns to the calling-source analysis processing.

FIG. 29 illustrates an example of the execution pattern table. The record of the execution pattern table in this example has a field for storing a load level, a field for storing CPU utilization of the application 203, and a field for storing an occupancy rate of the function to be processed.

The load level represents degrees of a load in the execution pattern in stages from "1" to "6". Each load level corresponds to CPU utilization of the illustrated application 203. A load level "7" corresponding to a state in which a load of the application 203 exceeds a limit may be provided.

FIG. 30 illustrates an example of weight data. In the weight data, a weight for the function to be processed is set.

Figure 31:
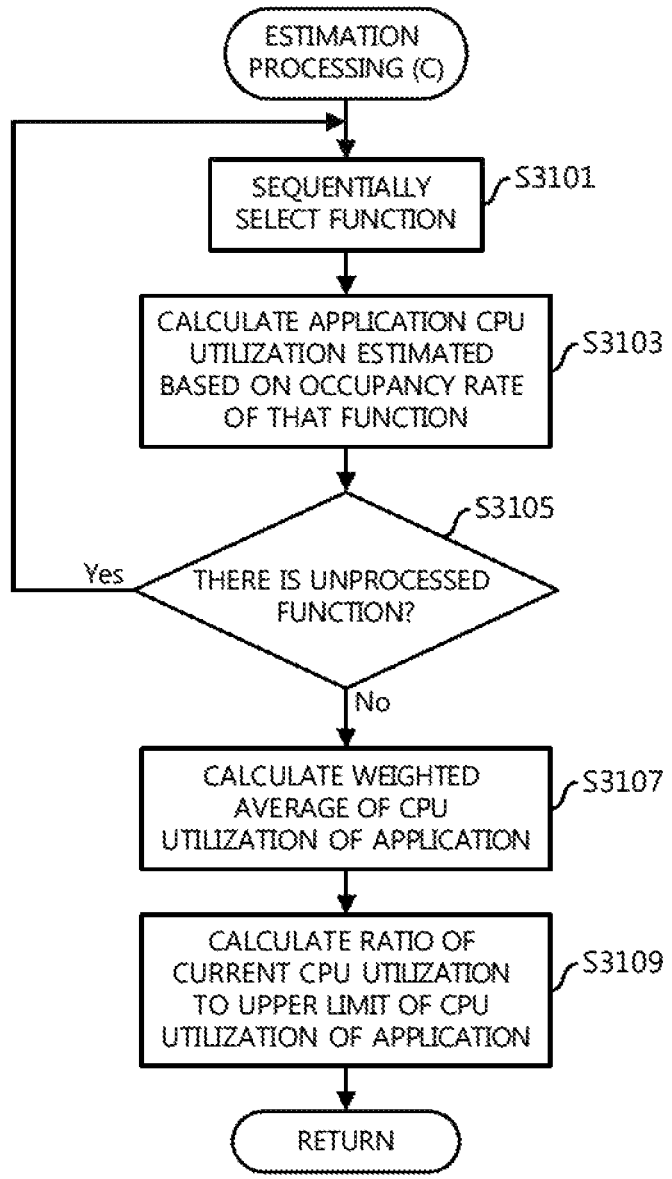
FIG. 31 is a diagram depicting the estimation processing flow (C)

In this embodiment, estimation processing (C) is executed in S1613 illustrated in FIG. 16. FIG. 31 illustrates an estimation processing (C) flow. The estimation unit 1205 sequentially selects functions to be processed, that is, functions whose occupancy rates are set in the execution pattern table (S3101).

The estimation unit 1205 calculates an application CPU utilization estimated based on the occupancy rate of the function (S3103).

Here, it is assumed that occupancy rate Y of the function in the second execution status table corresponds to a median of occupancy rate X of the function in execution pattern A corresponding to application CPU utilization S, and occupancy rate Z of the function in another execution pattern B corresponding to application CPU utilization U. Application CPU utilization T that corresponds to an internally dividing point is calculated by applying a ratio relating to a difference of occupancy rates to a difference of application CPU utilization, with respect to occupancy rate Y corresponding to an internally dividing point of two occupancy rates X and Z. Specifically, the estimation unit 1205 calculates a difference (Y−X) between an occupancy rate of the function in the second execution status table and an occupancy rate of the function in execution pattern A. In addition, the estimation unit 1205 calculates a difference (Z−Y) between an occupancy rate of the function in the execution pattern B and an occupancy rate of the function in the second execution status table. Then, the application CPU utilization Tin the execution status is obtained by dividing (Y−X) U+(Z−Y) S by (Z−X).

The estimation unit 1205 determines whether or not there is an unprocessed function (S3105). When it is determined that there is an unprocessed function, the processing returns to the processing of S3101 and the aforementioned processing is repeated.

On the other hand, when it is determined that there is no unprocessed function, the estimation unit 1205 calculates a weighted average of CPU utilization of the application 203 based on the weight data (S3107).

Furthermore, the estimation unit 1205 calculates a ratio of the current CPU utilization to the upper limit of CPU utilization of the application 203 (S3109). The upper limit of CPU utilization of the application 203 is set in advance. The upper limit corresponds to a level of a load that may lead to abnormal situations such as insufficient resources or malfunctions. The upper limit may correspond to CPU utilization lower than 100%. Upon completion of the estimation processing (C), the processing returns to the calling-source analysis processing.

According to this embodiment, it becomes possible to grasp a load of the application 203 more easily. In particular, there are aspects in which execution frequencies is able to be compared by functional units.

In addition, since the application CPU utilization corresponding to an internally dividing point is used, even if the number of records in the execution pattern table is small, the accuracy of estimation is enhanced.

In addition, since the weighted average of the application CPU utilization is obtained, it is possible to grasp a load more accurately according to importance of each function.

Further, since a ratio of the current application CPU utilization to the application CPU utilization corresponding to the load limit is calculated, it is easy to grasp a degree of imminence concerning an abnormal situation.

Embodiment 5

In this embodiment, an example of performing analysis based on execution frequencies in a group of functions will be explained.

FIG. 32 illustrates an example of a group table. The group table defines functions belonging to a group. The group table in this example has records corresponding to the group. The record of the group table has a field for storing a group name and plural fields for storing a function name. The group name identifies the group. The function name represents that the function is a member of the group.

FIG. 33 illustrates an example of the second execution status table according to the fifth embodiment. The second execution status table in this example has a record corresponding to a group of executed functions. The record of the second execution status table has a field for storing a group name, a field for storing the number of samples, and a field for storing an occupancy rate.

The group name represents a group to which the executed functions belong. The number of samples is, with respect to any function belonging to the group, the number of execution address values included in a program range of the function. The occupancy rate is a rate of the number of samples in the group to the total number of samples.

Figure 34:
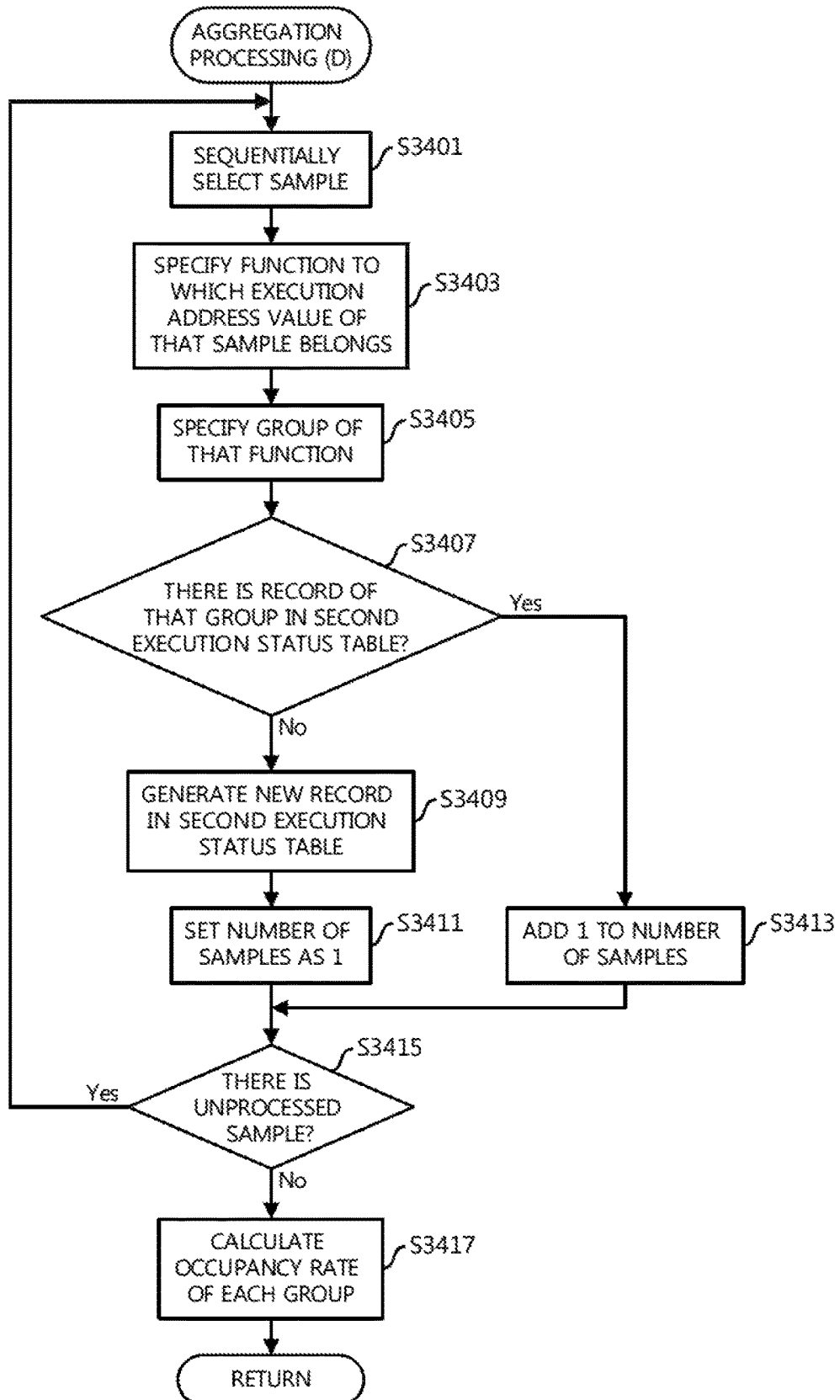
FIG. 34 is a diagram depicting an example of an aggregation processing flow (D)

In this embodiment, aggregation processing (D) is executed in S1611 illustrated in FIG. 16. FIG. 34 illustrates an aggregation processing (D) flow. The aggregation unit 1203 sequentially selects samples (S3401), and the aggregation unit 1203 specifies a function to which the execution address value of the sample belongs based on the function table (S3403). Further, the aggregation unit 1203 identifies a function group of the function based on the group table (S3405).

The aggregation unit 1203 determines whether or not there is a record of the group in the second execution status table (S3407). When it is determined that there is no record of the group in the second execution status table, the aggregation unit 1203 newly generates a record of the group in the second execution status table (S3409). The aggregation unit 1203 sets 1 to the field for storing the number of samples of the record (S3411).

On the other hand, when it is determined that there is a record of the group in the second execution status table, the aggregation unit 1203 adds 1 to the number of samples in the record (S3413).

Then, the aggregation unit 1203 determines whether or not there is an unprocessed sample in S3401 (S3415). When it is determined that there is an unprocessed sample, the processing returns to the processing of S3401 and the aforementioned processing is repeated.

On the other hand, when processing is completed for all the samples, the aggregation unit 1203 calculates an occupancy rate in each group (S3417). Specifically, by dividing the number of samples in the group by the total number of samples, the occupancy rate is obtained. The occupancy rate is set in the record of the second execution status table. Upon completion of the aggregation processing (D), the processing returns to the calling-source analysis processing.

FIG. 35 illustrates an example of the execution pattern table in the fifth embodiment. The record of the execution pattern table in this example has a field in which a load level is stored, a field in which CPU utilization of the application 203 is stored, and fields in which occupancy rates of the group to be processed is stored.

The load level represents degrees of a load in the execution pattern in stages from "1" to "6". Each load level corresponds to CPU utilization of the illustrated application 203. A load level "7" corresponding to a state in which the load of the application 203 exceeds the limit may be provided.

FIG. 36 illustrates an example of weight data in the fifth embodiment. In the weight data, a weight for the group to be processed is set.

Figure 37:
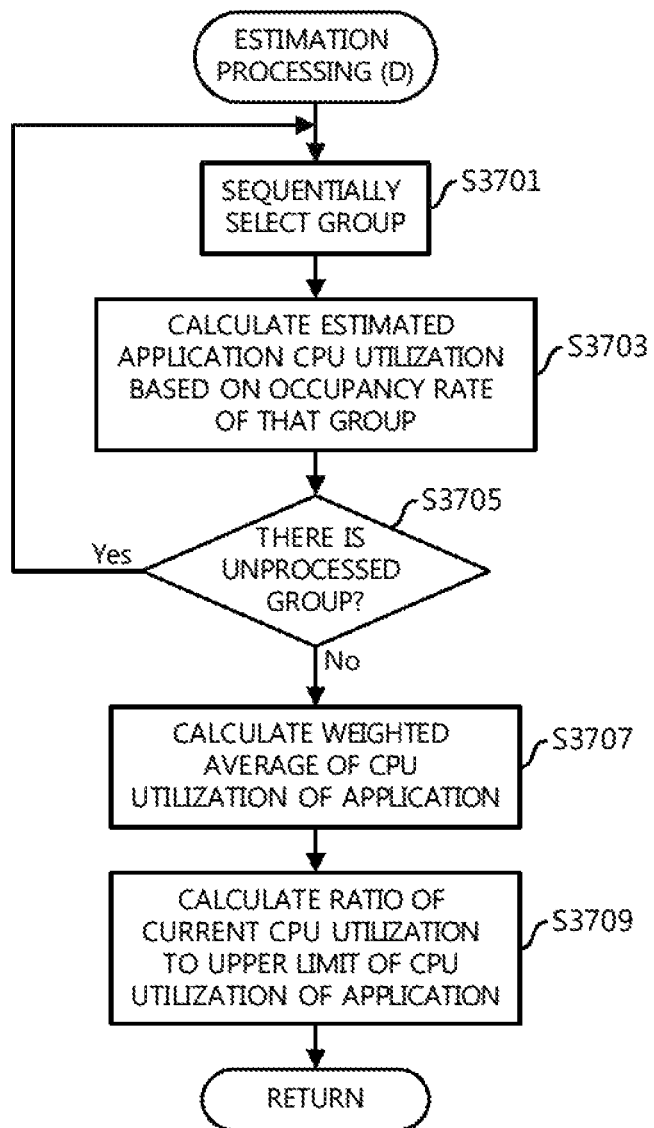
FIG. 37 is a diagram depicting an estimation processing flow (D)

In this embodiment, estimation processing (D) is executed in S1613 illustrated in FIG. 16 FIG. 37 illustrates an estimation processing (D) flow. The estimation unit 1205 sequentially selects groups to be processed, that is, groups whose occupancy rates are set in the execution pattern table (S3701).

The estimation unit 1205 calculates an estimated application CPU utilization based on the occupancy rate of the group (S3703).

Here, it is assumed that occupancy rate Y of the group in the second execution status table corresponds to a median of occupancy rate X of the group in execution pattern A corresponding to application CPU utilization S, and occupancy rate Z of the group in another execution pattern B corresponding to application CPU utilization U. Application CPU utilization T that corresponds to an internally dividing point is calculated by applying a ratio relating to a difference of occupancy rates to a difference of application CPU utilization, with respect to occupancy rate Y corresponding to an internally dividing point of two occupancy rates X and Z. Specifically, the estimation unit 1205 calculates a difference (Y−X) between an occupancy rate of the group in the second execution status table and an occupancy rate of the group in execution pattern A. In addition, the estimation unit 1205 calculates a difference (Z−Y) between an occupancy rate of the group in the execution pattern B and an occupancy rate of the group in the second execution status table. Then, the application CPU utilization T in the execution status is obtained by dividing (Y−X) U+(Z−Y) S by (Z−X).

The estimation unit 1205 determines whether or not there is an unprocessed group (S3705). When it is determined that there is an unprocessed group, the processing returns to the processing of S3701, and the aforementioned processing is repeated.

On the other hand, when it is determined that there is no unprocessed group, the estimation unit 1205 calculates a weighted average of CPU utilization of the application 203 based on the weight data (S3707).

Furthermore, the estimation unit 1205 calculates a ratio of the current CPU utilization to the upper limit of CPU utilization of the application 203 (S3709). The upper limit of CPU utilization of the application 203 is set in advance. Upon completion of the estimation processing (D), the processing returns to the calling-source analysis processing.

According to this embodiment, it is possible to compare the execution frequency by units of higher-level functions.

In the processing of S1103 illustrated in FIG. 11, the collection driver 701 may obtain attached data together with an execution address value at a time of occurrence of the timer interruption, and stores the attached data in the record represented by a pointer together with the execution address value in S1105.

The attached data is information for distinguishing, for example, the system mode from the user mode. In this case, it is possible to select only samples related to the user mode as samples to be collected in the aggregation processing.

Further, the attached data may be, for example, a register or a selector for specifying a segment. In this case, in the aggregation processing, addresses and functions of samples may be collected separately depending on segments.

Although the embodiments of this invention were explained above, this invention is not limited to those. For example, the aforementioned functional block configuration does not always correspond to actual program module configuration.

Moreover, the aforementioned configuration of each storage area is a mere example, and may be changed. Furthermore, as for the processing flow, as long as the processing results do not change, the turns of the steps may be exchanged or the steps may be executed in parallel.

In addition, the aforementioned sever apparatus 101 is a computer apparatus as illustrated in FIG. 38. That is, a memory 2501, a CPU 2503 (central processing unit), a HDD (hard disk drive) 2505, a display controller 2507 connected to a display device 2509, a drive device 2513 for a removable disk 2511, an input unit 2515, and a communication controller 2517 for connection with a network are connected through a bus 2519 as illustrated in FIG. 38. An operating system (OS) and an application program for carrying out the foregoing processing in the embodiments, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In these embodiments of this invention, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer apparatus as stated above, the hardware such as the CPU 2503 and the memory 2501, the OS and the application programs systematically cooperate with each other, so that various functions as described above in details are realized.

The aforementioned embodiments of this invention may be summarized as follows:

A load estimation method related to a first aspect of this embodiment includes: (A) collecting execution information of a processor being executing a predetermined program; (B) specifying execution status of the processor based on the collected execution information; and (C) estimating a load of the predetermined program based on a result of comparison between the execution status of the processor and execution characteristics of the processor, wherein each of the execution characteristics is stored in association with a load level of the predetermined program.

In this way, it becomes possible to grasp a load of the predetermined program more easily.

Furthermore, the execution status of the processor and the execution characteristics may include a feature based on a frequency distribution of execution addresses in the processor.

In this way, it is possible to more accurately estimate a load based on a feature that execution parts differ depending on a magnitude of the load.

Furthermore, a range of ranks in the frequency distribution may be set according to a spread of execution addresses included in a predetermined upper-limit range.

This makes it easier to distinguish load status based on an execution frequency of a part expected to be a routine of the predetermined program.

Furthermore, the execution status of the processor and the execution characteristics may include a feature based on two types of frequency distributions whose predetermined upper-limit ranges are different.

This makes it easier to distinguish load status based on an execution frequency of a part expected to be a large routine and a part expected to be a small routine.

Furthermore, the estimating may include specifying a load level associated with an execution characteristic that is similar to the execution status of the processor.

In this way, it becomes possible to grasp predetermined number of levels of loads.

Furthermore, the estimating may include calculating, based on a ratio of differences between an indicator value included in the execution status of the processor and each of two indicator values that have a same type and are included in two execution characteristics, a degree of the load of the processor, which corresponds to an internally dividing point of load levels associated with the two execution characteristics.

In this way, it becomes possible to grasp a load with higher precision.

A load estimation method related to a second aspect of this embodiment includes: (D) collecting execution information of a processor being executing a predetermined program; (E) specifying execution status of a routine of the predetermined program based on the collected execution information; and (F) estimating a load of the predetermined program based on a result of comparison between the execution status of the routine and execution patterns of routines of the predetermined program, wherein each of the execution patterns is stored in association with a load level of the predetermined program.

In this way, it becomes possible to grasp a load of the predetermined program more easily.

Furthermore, the execution status of the routine and the execution patterns may include a frequency that execution addresses in the processor corresponds to the routine.

This makes it possible to compare execution frequencies by functional units.

Furthermore, the execution status of the routine and the execution patterns may include a frequency that execution addresses in the processor corresponds to a group of routines.

This makes it possible to compare execution frequencies by units of higher-level functions.

Furthermore, the estimating may include calculating, based on a ratio of differences between an indicator value included in the execution status of the routine and each of two indicator values that have a same type and are included in two execution patterns, a degree of the load of the processor, which corresponds to an internally dividing point of load levels associated with the two execution patterns.

It becomes possible to grasp a load with higher precision.

Furthermore, the estimating may include calculating a weighted average of degrees of loads calculated for of plural types of indicator values.

In this way, it becomes possible to grasp a load more accurately according to importance of each indicator value.

Furthermore, the estimating may include calculating a ratio of a current load to a limit of the load of the predetermined program.

This makes it easier to grasp the degree of imminence concerning abnormal situations such as insufficient resources and malfunctions.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    sampling execution addresses of a processor that is executing a predetermined program;
    generating feature data relating to a frequency distribution of the sampled execution addresses of the processor;
    calculating, for each of a plurality of load levels, a similarity between the generated feature data with reference feature values defined for the load level and relating to a reference frequency distribution of execution address;
    selecting one or more load levels from among the plurality of load levels based on calculated similarities; and
    estimating a load of the predetermined program based on the one of more selected load levels,
    the generated feature data and the reference feature values include values relating to two types of frequency distributions that include a plurality of address blocks, and a predetermined maximum range of the plurality of address blocks in a first type of frequency distribution is different from a predetermined maximum range of the plurality of address blocks in a second type of frequency distribution.

2. The non-transitory computer-readable storage medium as set forth in claim 1, wherein an address range of address blocks in the frequency distribution is variable within a predetermined maximum range and set according to an actual address range of the sampled execution addresses.

3. A non-transitory computer-readable storage medium storing a program that causes a computer to execute a process, the process comprising:
    sampling execution addresses of a processor that is executing a predetermined program;
    generating feature data relating to a frequency distribution of executed routines or groups of routines, which are included in the predetermined program based on the sampled execution addresses;
    specifying, for each predefined routine or each predefined group of routines, two predefined load levels for two reference features based on a feature for the predefined routine or the predefined group, which is included in the generated feature data;
    calculating, for each predefined routine or each predefined group of routines, a load based on the specified two predefined load levels for the two reference features, the two reference features and the feature for the routine or the predetermined group, which is included in the generated feature data; and
    estimating a load of the predetermined program based on calculated loads for predefined routines or predefined groups of routines,
    the feature and the reference features include values relating to two types of frequency distributions that include a plurality of address blocks, and a predetermined maximum range of the plurality of address blocks in a first type of frequency distribution is different from a predetermined maximum range of the plurality of address blocks in a second type of frequency distribution.

4. The non-transitory computer-readable storage medium as set forth in claim 3, wherein the estimating comprises calculating a weighted average of loads calculated for the predefined routines or the predefined groups of routines.

5. The non-transitory computer-readable storage medium as set forth in claim 4, wherein the estimating further comprises calculating a ratio of the estimated load to a limit of the load of the predetermined program.

6. A load estimation method, comprising:
sampling, by using a computer, execution addresses of a processor that is executing a predetermined program;
generating, by using the computer, feature data relating to a frequency distribution of the sampled execution addresses of the processor;
calculating, by using the computer, for each of a plurality of load levels, a similarity between the generated feature data with reference feature values defined for the load level and relating to a reference frequency distribution of execution address;
selecting, by using the computer, one or more load levels from among the plurality of load levels based on calculated similarities; and
estimating, by using the computer, a load of the predetermined program based on the one of more selected load levels,
the generated feature data and the reference feature values include values relating to two types of frequency distributions that include a plurality of address blocks, and a predetermined maximum range of the plurality of address blocks in a first type of frequency distribution is different from a predetermined maximum range of the plurality of address blocks in a second type of frequency distribution.

7. A non-transitory computer-readable storage medium storing a program that causes a computer to execute a process, the process comprising:
sampling execution addresses of a processor that is executing a predetermined program;
generating feature data relating to a frequency distribution of the sampled execution addresses of the processor;
calculating, for each of a plurality of load levels, a similarity between the generated feature data with reference feature values defined for the load level and relating to a reference frequency distribution of execution address;
selecting one or more load levels from among the plurality of load levels based on calculated similarities; and
estimating a load of the predetermined program based on the one of more selected load levels,
the selecting comprises specifying two load levels for two reference feature values based on the calculated similarities; and
the estimating comprises calculating a load of the predetermined program based on the specified two load levels for the two reference feature values, a first similarity between one of the two reference feature values and the generated feature data and a second similarity between the other of the two reference feature values and the generated feature data.

* * * * *